(12) United States Patent
Reidhaar

(10) Patent No.: US 8,752,696 B2
(45) Date of Patent: *Jun. 17, 2014

(54) MULTI-TRANSLATIVE ROLL ASSEMBLY

(75) Inventor: Glen Alan Reidhaar, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 261 days.

This patent is subject to a terminal disclaimer.

(21) Appl. No.: 13/098,888

(22) Filed: May 2, 2011

(65) Prior Publication Data

US 2012/0279830 A1 Nov. 8, 2012

(51) Int. Cl.
*B65G 13/02* (2006.01)

(52) U.S. Cl.
USPC .............................. 198/780; 271/226; 180/7.1

(58) Field of Classification Search
USPC ................... 198/780, 457.02, 370.09
See application file for complete search history.

(56) References Cited

U.S. PATENT DOCUMENTS

| | | | | |
|---|---|---|---|---|
| 4,475,731 A * | 10/1984 | Wood | ........................... | 271/9.05 |
| 4,907,692 A * | 3/1990 | Sogge | ........................... | 198/780 |
| 6,315,109 B1 * | 11/2001 | Dean | ............................. | 198/786 |
| 6,726,524 B2 * | 4/2004 | Yamaguchi et al. | .......... | 446/431 |
| 7,380,782 B2 * | 6/2008 | Lien | ............................. | 271/109 |
| 7,621,355 B2 * | 11/2009 | Chu et al. | ........................ | 180/7.2 |
| 7,980,335 B2 * | 7/2011 | Potter | ........................... | 180/7.1 |
| 8,210,522 B2 * | 7/2012 | Blair et al. | ..................... | 271/122 |
| 2003/0067209 A1 * | 4/2003 | Marrero | ....................... | 301/5.23 |
| 2008/0087484 A1 * | 4/2008 | Fenelli et al. | ................. | 180/236 |
| 2010/0187779 A1 * | 7/2010 | Potter | ......................... | 280/5.514 |

OTHER PUBLICATIONS

Photographs of TRI-BOT toy sold by WowWee Robotics (TM) having barrel shaped idler rolls (attached).

* cited by examiner

*Primary Examiner* — Ramya Burgess
*Assistant Examiner* — Thomas Randazzo
(74) *Attorney, Agent, or Firm* — Justin M Tromp; John Victor Pezdek

(57) ABSTRACT

A roll assembly according to one example embodiment includes a rotatable input shaft having a rotational axis. At least one gear is mounted on the input shaft that rotates with the input shaft. A carrier frame is mounted on the input shaft and rotatable independent of the input shaft about the rotational axis of the input shaft. A plurality of rolls is rotatably mounted about a periphery of the carrier frame. An axial direction of rotation of each roll is transverse to the rotational axis of the input shaft. Each roll has a contact surface and a gear face that is operatively coupled to the at least one gear.

20 Claims, 19 Drawing Sheets

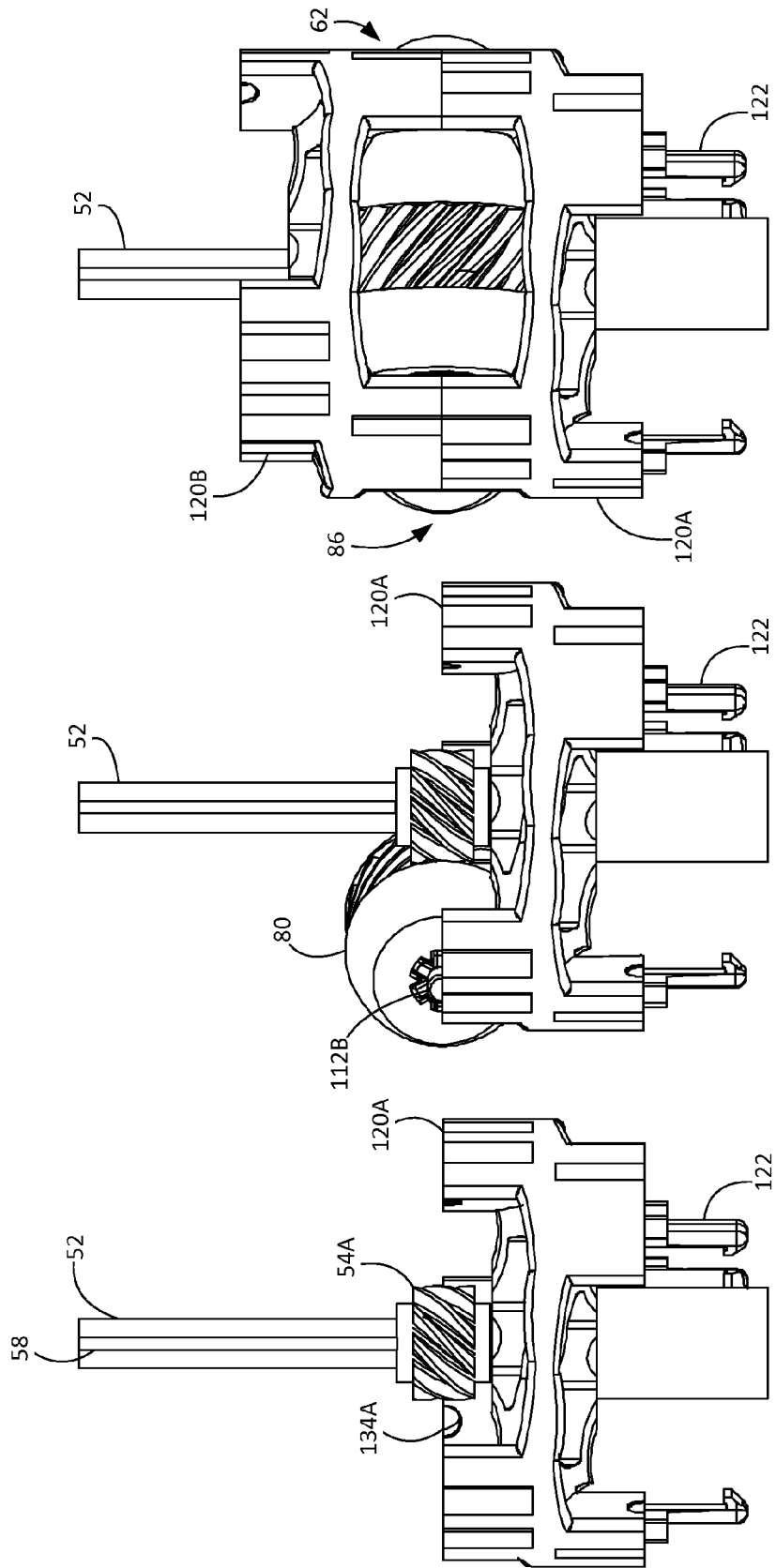

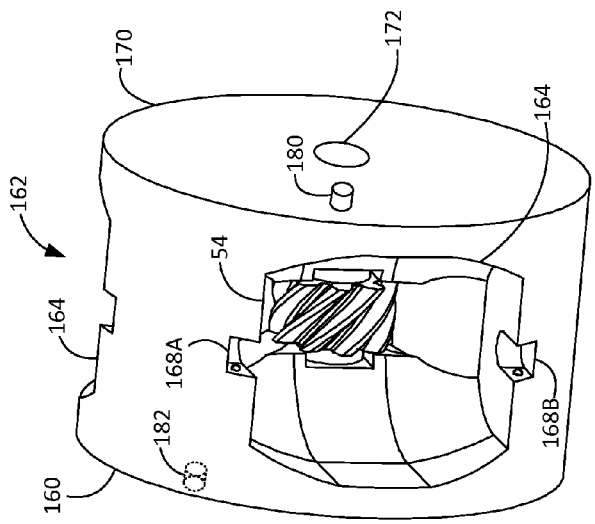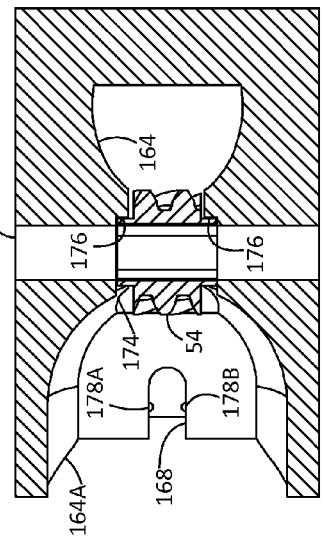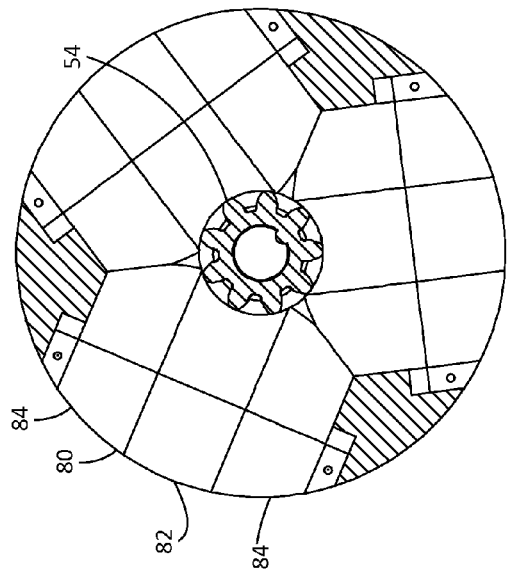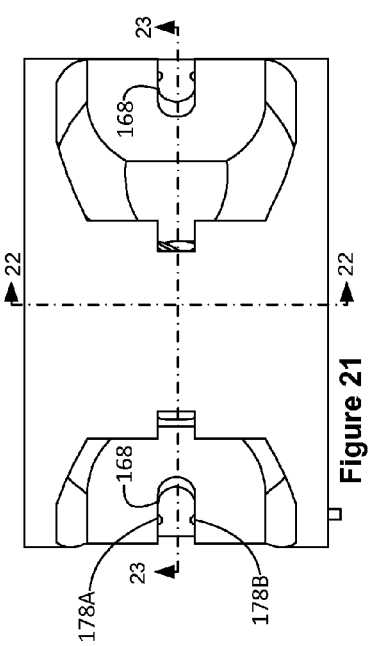

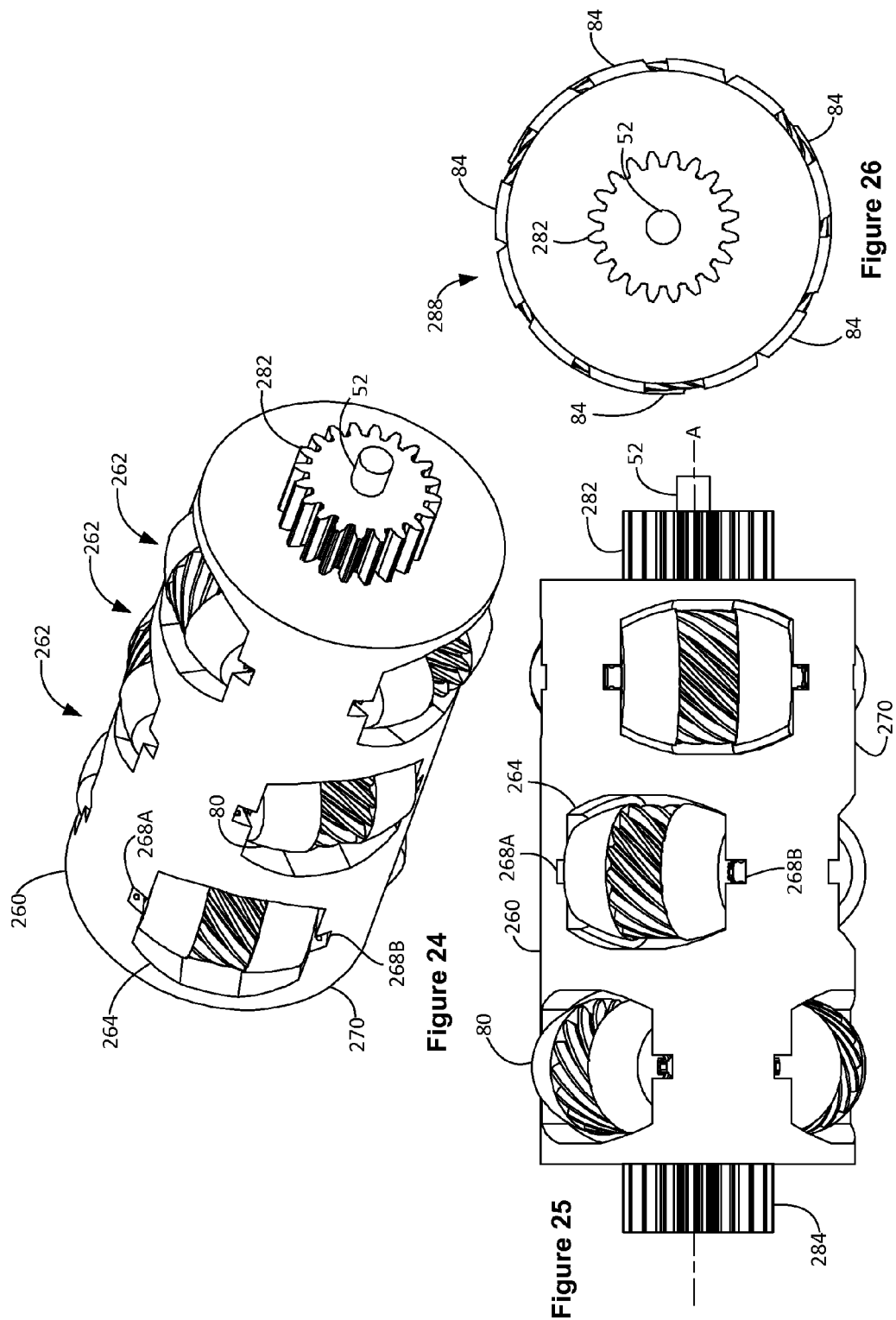

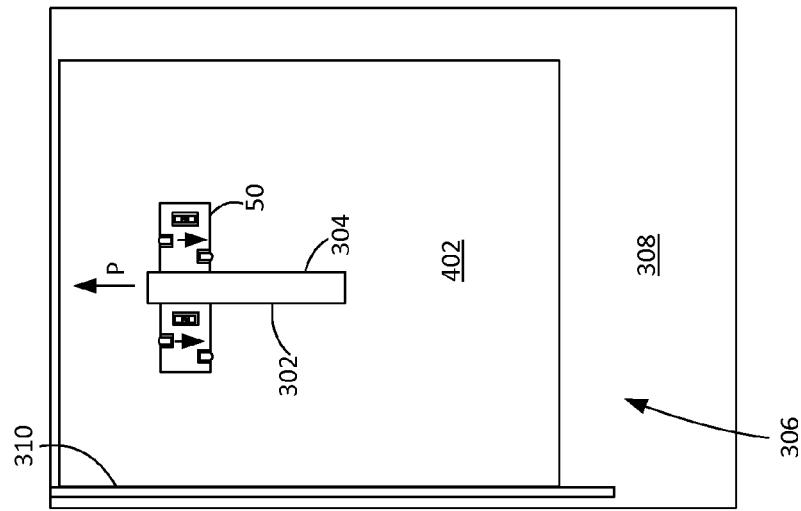
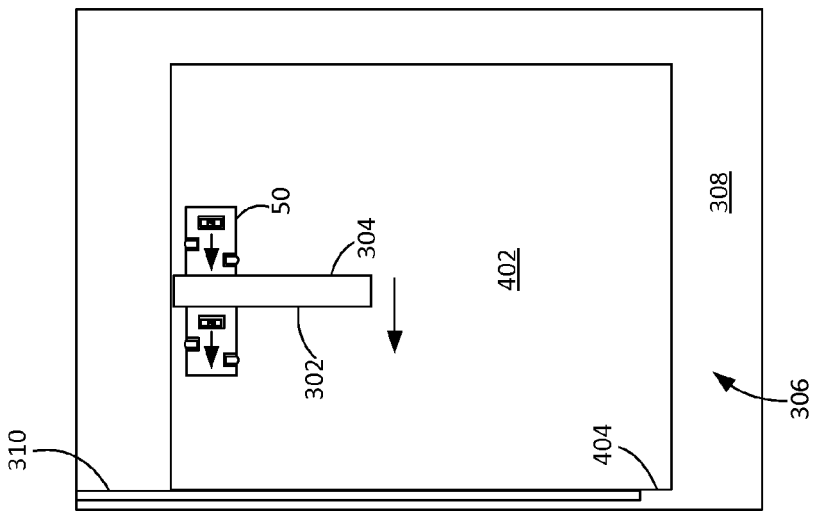
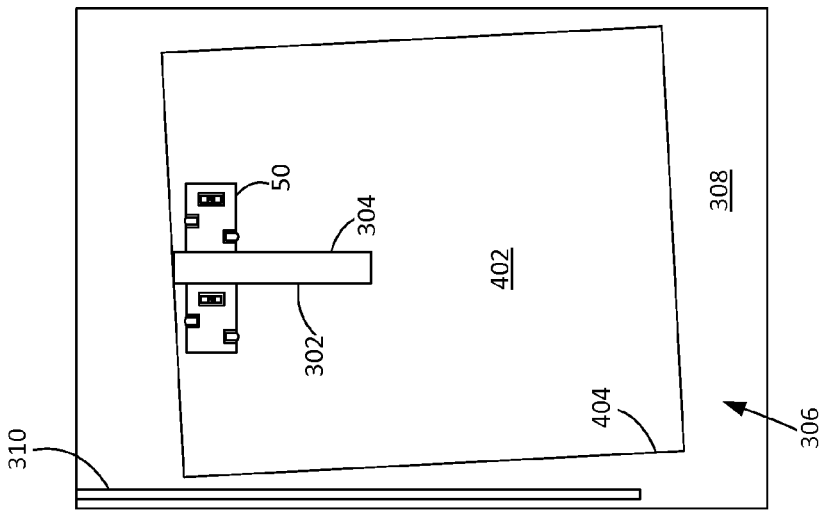

MULTI-TRANSLATIVE ROLL ASSEMBLY

CROSS REFERENCES TO RELATED APPLICATIONS

This patent application is related to U.S. patent application Ser. No. 13/098,796, filed May 2, 2011, entitled "Multi-Translative Roll Assembly Having a One-Way Clutching Surface" and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Disclosure

The present invention relates generally to a roll assembly, and more particularly to a roll assembly that is able to move an object in multiple translative directions such as either of two generally perpendicular directions.

2. Description of the Related Art

One example use for a multi-translative roll assembly is in an imaging device such as a printer, copier, or automatic document feed scanner. In the imaging process used in such devices, a series of rolls and/or belts picks media from a media storage location and advances it in a media process direction along a media path through an image transfer or scanning section of the device. In order to precisely transfer an image to the media or precisely scan the media, it must be properly aligned in both the media process direction and a direction perpendicular to the media process direction. Otherwise, the printed or scanned image may be skewed or offset.

Alignment in the media process direction may be accomplished by controlling the timing of the advancement of the media through the image transfer or scanning section. Positioning the media perpendicular to the media process direction is typically accomplished using either an edge-referenced system or a center-referenced system, which commonly employs short edge-referenced portions to locate the media.

One conventional approach to edge reference media is to pass a side edge of the media through a rotating nip formed between a driven roll and a backup roll or "skew roll." The driven roll has an axis perpendicular to the reference edge and the skew roll is angled slightly (e.g., four degrees) with respect to the driven roll to direct the media toward the reference edge. A relatively large amount of travel in the media process direction must be provided to allow sufficient space for the entire side edge of the media to migrate toward and meet the reference edge.

In order to increase the output speed of an imaging device, it is generally beneficial to shorten the length of the media path. However, a shorter media path provides less space to migrate the media toward the reference edge. Accordingly, it will be appreciated that a device that is able to selectively advance media in either a media process direction or toward a reference edge with little or no travel in the media process direction is desired to reduce the length of the media path. Such a device is also desired for applications outside the imaging industry where it is advantageous to be able to move objects in either of two generally perpendicular directions such as, for example, in a conveyor system on a manufacturing assembly line or a sorting line or on the wheels of a motorized vehicle such as, for example a forklift.

SUMMARY

A multi-translative roll assembly according to one example embodiment includes a rotatable input shaft having a rotational axis. At least one gear is mounted on the input shaft that rotates with the input shaft. A carrier frame is mounted on the input shaft and rotatable independent of the input shaft about the rotational axis of the input shaft. A plurality of rolls is rotatably mounted about a periphery of the carrier frame. An axial direction of rotation of each roll is transverse to the rotational axis of the input shaft. Each roll has a contact surface and a gear face that is operatively coupled to the at least one gear.

According to a second example embodiment, a device has a roll assembly for advancing an object in contact with the roll assembly or providing translative movement to the device relative to a surface in contact with the roll assembly. The roll assembly includes a rotatable input shaft having a rotational axis. A plurality of gears are mounted on the input shaft that rotate with the input shaft. Each of a plurality of sets of rotatable rolls is operatively coupled to a corresponding gear of the plurality of gears. An axial direction of rotation of each roll is transverse to the rotational axis of the input shaft. Each roll has a gear face that engages with the corresponding gear and a friction surface portion for contacting the object or the surface. A diameter of at least a portion of the friction surface portion of the roll is greater than or equal to a diameter of the gear face of the roll. A trunnion extends from each axial end of the roll. A carrier frame is mounted on the input shaft and rotatable independent of the input shaft about the rotational axis of the input shaft. The carrier frame has a generally cylindrical outer surface. The carrier frame further includes a plurality of sets of circumferentially spaced openings each corresponding to a respective set of rolls. The sets of openings are axially spaced from each other along the input shaft. One of the rolls is rotatably mounted in each of the openings. A portion of each roll protrudes outside its respective opening past the outer circumference of the carrier frame to permit contact with the object or the surface. A pair of trunnion mounts is formed in each opening. Each trunnion mount receives a respective one of the trunnions of a corresponding roll to permit rotation of the roll relative to the carrier frame.

BRIEF DESCRIPTION OF THE DRAWINGS

The above-mentioned and other features and advantages of the various embodiments, and the manner of attaining them, will become more apparent and will be better understood by reference to the accompanying drawings.

FIGS. 16-18 are sequential side elevation views illustrating the construction of a multi-translative roll assembly according to one example embodiment.

FIG. 20 is a perspective view of a carrier frame according to a first alternative embodiment.

FIG. 21 is a side elevation view of the carrier frame illustrated in FIG. 20.

FIG. 22 is a first cross-sectional view of the carrier frame illustrated in FIG. 21.

FIG. 23 is a second cross-sectional view of the carrier frame illustrated in FIG. 21.

FIG. 24 is a perspective view of a carrier frame according to a second alternative embodiment.

FIG. 25 is a side elevation view of the carrier frame illustrated in FIG. 24.

FIG. 26 is an end elevation view of the carrier frame illustrated in FIG. 24.

FIGS. 28-30 are schematic views illustrating the de-skewing capabilities of the pick mechanism having the multi-translative roll assembly illustrated in FIG. 27.

DETAILED DESCRIPTION

Figure 1:
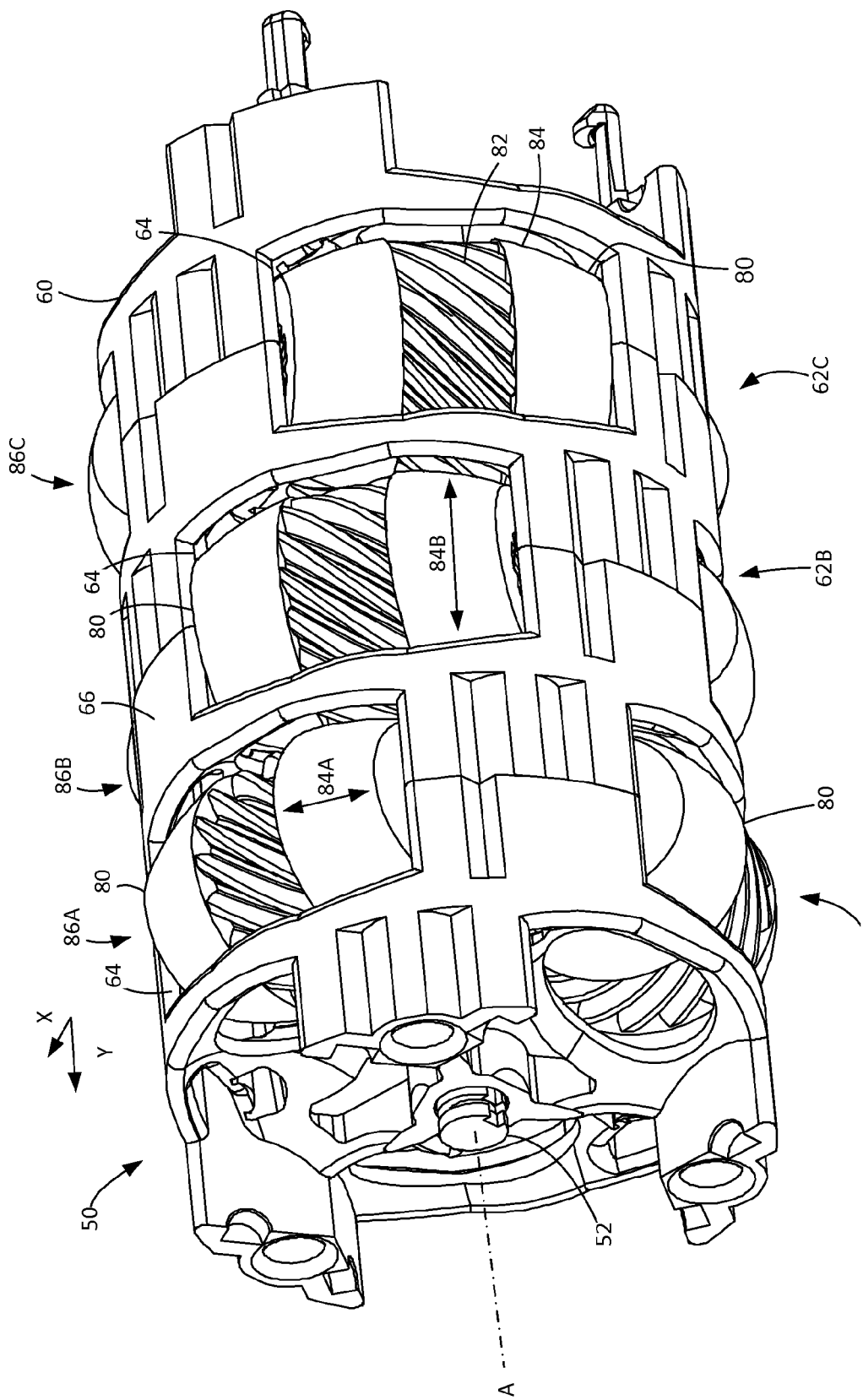
FIG. 1 is a perspective view of a multi-translative roll assembly according to one example embodiment.

The following description and drawings illustrate embodiments sufficiently to enable those skilled in the art to practice the present invention. It is to be understood that the disclosure is not limited to the details of construction and the arrangement of components set forth in the following description or illustrated in the drawings. The invention is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present invention is defined by the appended claims.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 2A:
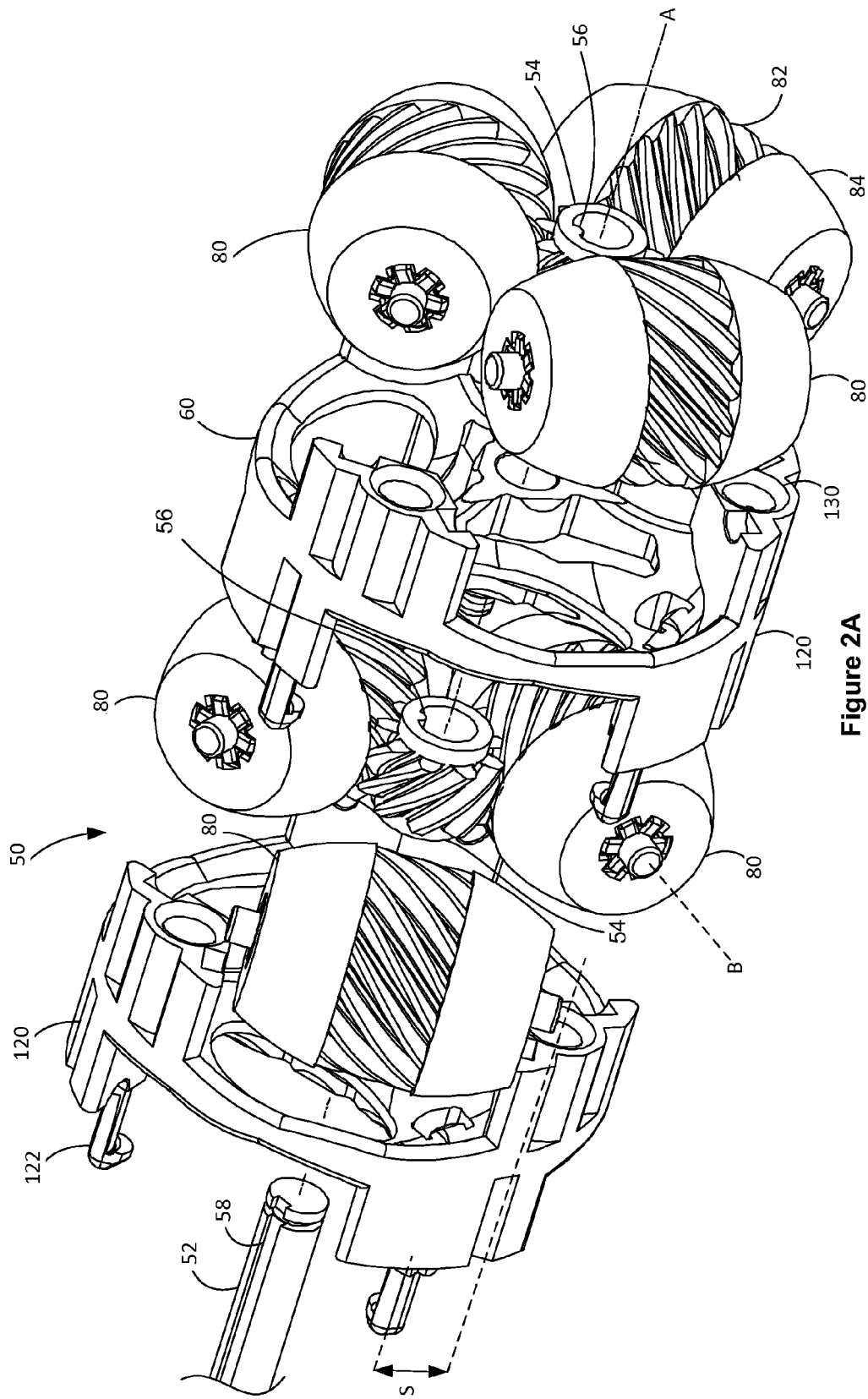
FIG. 2A is an exploded view of the roll assembly illustrated in FIG. 1.
Figure 2B:
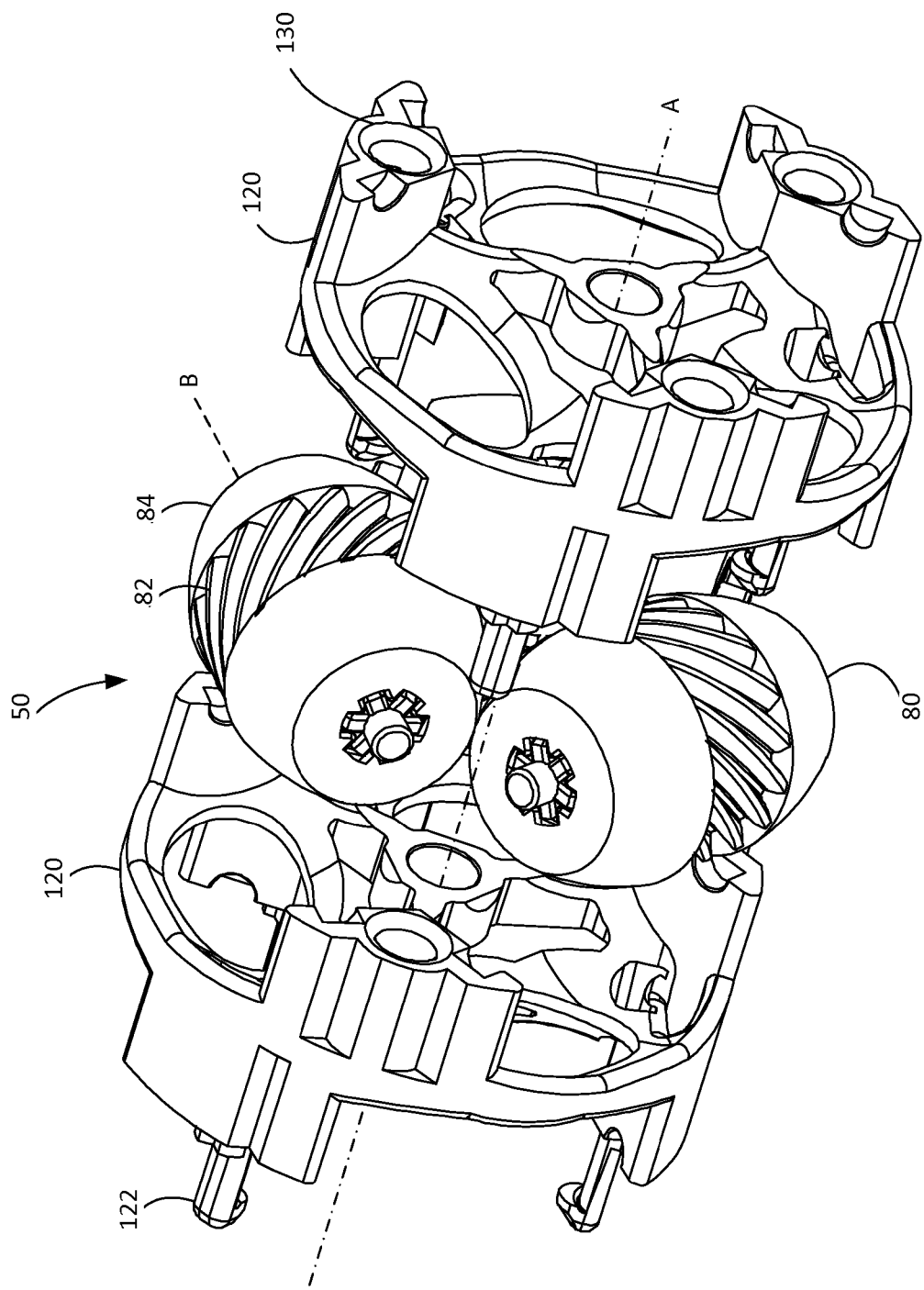
FIG. 2B is an exploded view of a carrier frame of the roll assembly illustrated in FIG. 1.
Figure 5:
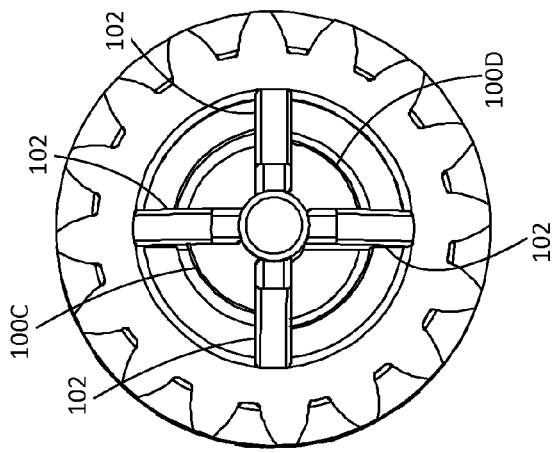
FIG. 5 is an elevation view from a second end of the roll illustrated in FIG. 3.
Figure 3:
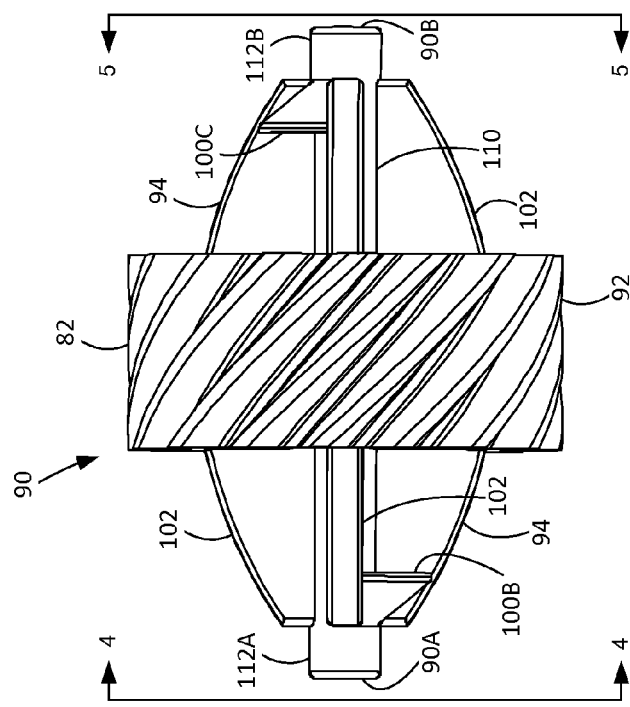
FIG. 3 is a top plan view of a roll according to one example embodiment.
Figure 4:
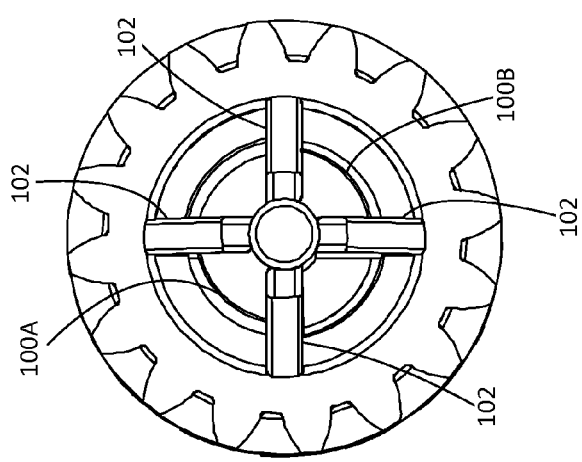
FIG. 4 is an elevation view from a first end of the roll illustrated in FIG. 3.
Figure 6:
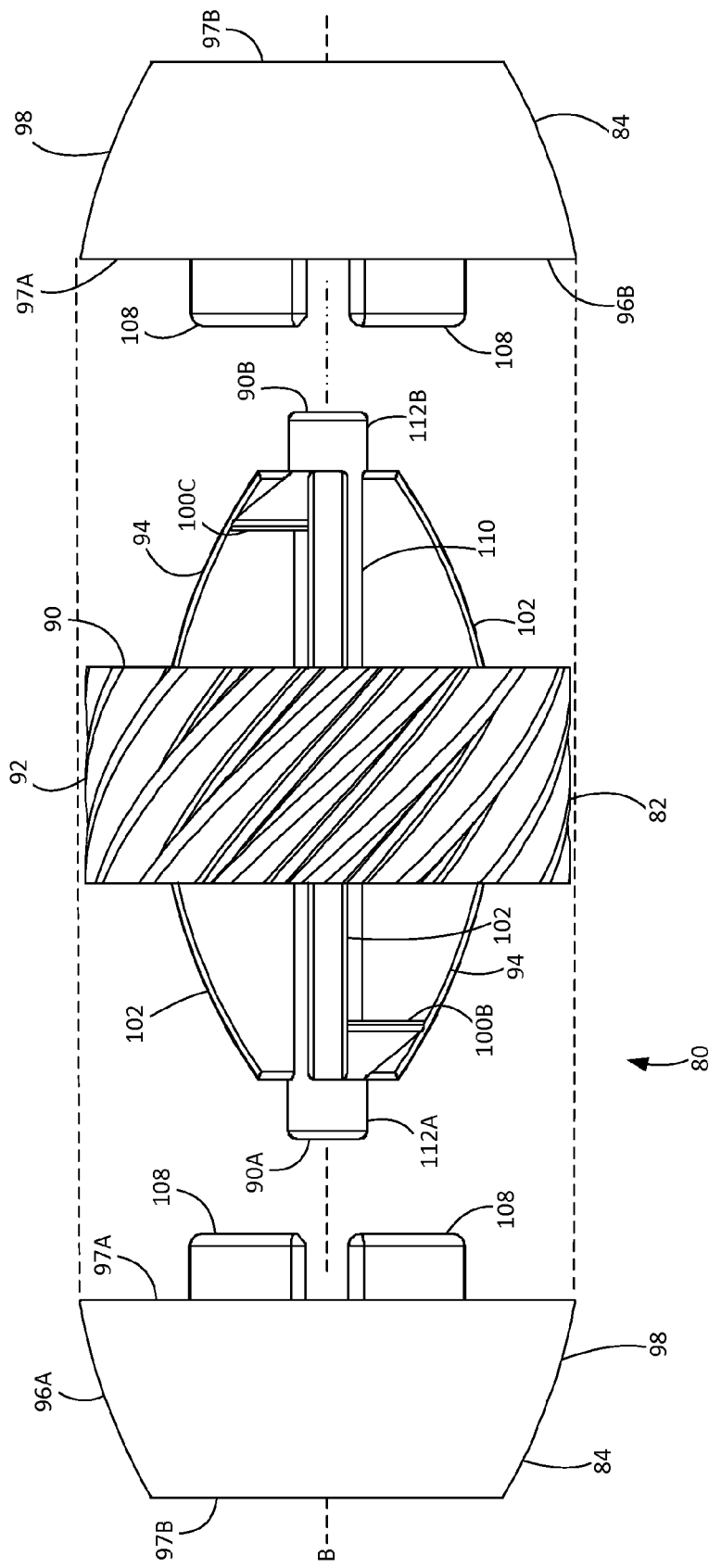
FIG. 6 is an exploded view of a roll according to one example embodiment having a hub and a pair of tires.
Figure 9:
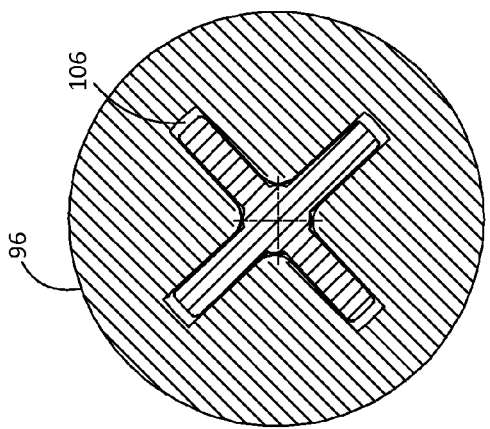
FIG. 9 is a second cross-section view of the roll illustrated in FIG. 7.
Figure 7:
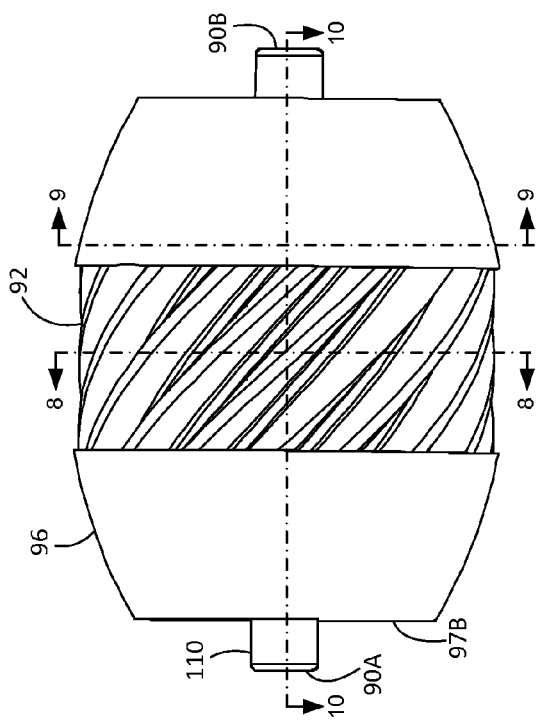
FIG. 7 is a top plan view of the roll illustrated in FIG. 6 with the pair of tires positioned on the hub.
Figure 10:
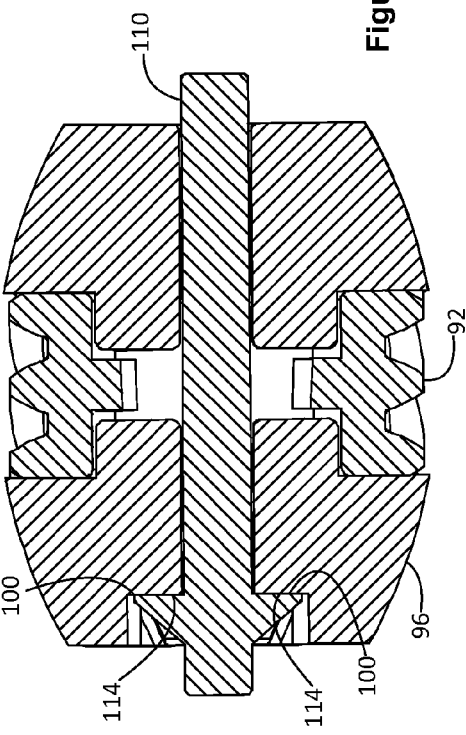
FIG. 10 is a third cross-sectional view of the roll illustrated in FIG. 7.
Figure 8:
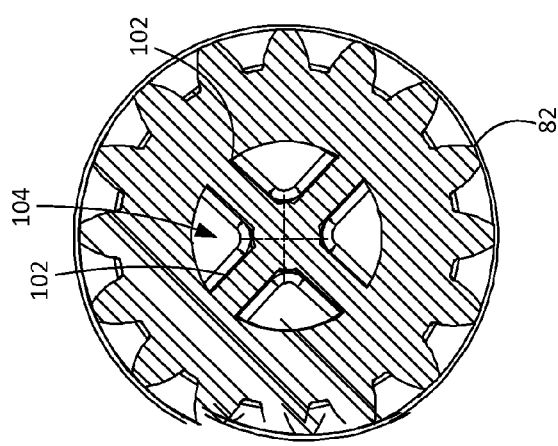
FIG. 8 is a first cross-sectional view of the roll illustrated in FIG. 7.

Referring to FIGS. 1, 2A and 2B, a roll assembly 50 includes a rotatable input shaft 52 having a rotational axis A. Input shaft 52 is operatively coupled to a drive source (not shown) that provides a drive force to input shaft 52 by conventional means. Upon receipt of the drive force by input shaft 52, roll assembly 50 can be used either to feed an object in contact with roll assembly 50 when roll assembly 50 is mounted in a fixed position or to provide translative movement to an object upon which roll assembly 50 is mounted relative to a surface in contact with roll assembly 50. Alternatives include those wherein input shaft 52 is passively driven by objects passing roll assembly 50.

Input shaft 52 includes at least one gear 54 mounted thereon that rotates with input shaft 52. In the example embodiment illustrated, gear 54 is slidably mounted on input shaft 52. In this embodiment, gear 54 includes a key 56 that is received by a corresponding keyway 58 of input shaft 52 so that gear 54 rotates with input shaft 52. It will be appreciated that the keying arrangement illustrated can be reversed such that gear 54 includes a keyway and input shaft 52 includes a corresponding key. Further, any other suitable mounting arrangement may be used so long as gear 54 rotates with input shaft 52. For example, gear 54 may be fixedly mounted on input shaft 52. In the example embodiment illustrated, gear 54 is a helical pinion gear; however, any suitable gear may be used such as, for example a worm gear.

Input shaft 52 also includes a carrier frame 60 mounted thereon. Carrier frame 60 is rotatable independent of input shaft 52 about rotational axis A. In the example embodiment illustrated, carrier frame 60 has a generally cylindrical outer surface 66; however, outer surface 66 may have any suitable shape such as, for example a hexagonal or octagonal cross section. Carrier frame 60 includes at least one set 62 of circumferentially spaced openings 64 therein. A plurality of rolls 80 are rotatably mounted about a periphery of carrier frame 60. Each roll 80 has an axial direction of rotation B that is transverse to rotational axis A of input shaft 52. Each roll 80 includes a gear face 82 that is operatively coupled to a respective gear 54 and a contact surface 84 that contacts the object being fed by roll assembly 50 or the surface against which roll assembly 50 advances. At least a portion of contact surface 84 has a larger diameter than gear face 82 to prevent contact between gear face 82 and the object being fed by roll assembly 50 or the surface against which roll assembly 50 advances. In some embodiments, contact surface 84 is composed of a relatively high friction material such as a natural rubber, e.g., isoprene, or a synthetic rubber, e.g., EPDM, in order to enhance its feeding ability. It will be appreciated that, as desired, contact surface 84 may include additional features to aid in the specific application in which roll assembly 50 is employed such as, for example tread to provide better traction.

Each roll 80 is rotatably mounted in one of the openings 64 in carrier frame 60. A portion of each roll 80 protrudes outside its respective opening 64 past the outer periphery of carrier frame 60 to permit contact with the object being fed by roll assembly 50 or the surface against which roll assembly 50 advances. In the example embodiment illustrated, roll assembly 50 includes three sets 62A, 62B, 62C of circumferentially spaced openings 64 and three corresponding sets 86A, 86B, 86C of rolls 80. Sets 62 of openings 64 are axially spaced from each other along input shaft 52, as are the corresponding sets 86 of rolls 80. It will be appreciated that any suitable number of sets 62, 86 of openings 64 and rolls 80 may be used. In some cases, fewer sets 62, 86 may be desired in order to minimize the axial length of roll assembly 50. In others, more sets 62, 86 may be desired to provide a greater number of contact points with the object being fed by roll assembly 50 or the surface against which roll assembly 50 advances.

In operation, roll assembly 50 can be used to selectively feed or advance an object in a direction X substantially perpendicular to input shaft 52, a direction Y transverse to direction X or a combination thereof. For feeding or advancing an object in direction X, when input shaft 52 rotates, rolls 80 do not rotate about their respective axes B thereby causing the rotational force from input shaft 52 to be transferred to carrier frame 60 which causes carrier frame 60 to rotate with input shaft 52 about axis A. As carrier frame 60 rotates, a latitudinal portion 84A of each contact surface 84 contacts the object being fed by roll assembly 50 or the surface against which roll assembly 50 advances. By circumferentially offsetting adjacent sets 62, 86 of openings 64 and rolls 80 from each other, it is possible to form a continual contact surface 88 around the outer periphery of carrier frame 60. For example, as seen in the end view depicted in FIG. 19, latitudinal portions 84A of contact surfaces 84 are spaced around the outer circumference of roll assembly 50 in a continual manner to ensure that the object being fed by roll assembly 50 or the surface against which roll assembly 50 advances is in contact with one or more contact surfaces 84 at substantially all times as carrier frame 60 rotates with input shaft 52. In this manner, as carrier frame 60 rotates, contact with the object or surface is passed circumferentially from one contact surface 84 to the next. If rolls 80 are not circumferentially offset or if large circumferential gaps are present between rolls 80, the rotation of carrier frame 60 may tend to be uneven or bumpy due to the difference between the distance from axis A to outer surface 66 of carrier frame 60 and the distance from axis A to latitudinal portions 84A of contact surfaces 84 as well as any frictional differences between outer surface 66 of carrier frame 60 and contact surfaces 84.

For feeding or advancing an object in direction Y transverse to direction X, when input shaft 52 rotates, the rotational force from input shaft 52 is transferred through gear(s) 54 to rolls 80 thereby causing rolls 80 to rotate about their respective axes B and carrier frame 60 to remain substantially stationary relative to input shaft 52. As rolls 80 rotate, a longitudinal portion 84B of each contact surface 84 contacts the object being fed by roll assembly 50 or the surface against which roll assembly 50 advances. By circumferentially offsetting adjacent sets 62, 86 of openings 64 and rolls 80 from each other, it is possible to ensure that at least one roll 80 is in contact with the object or surface. Otherwise, if significant circumferential gaps are present between adjacent contact surfaces 84, depending on the orientation of carrier frame 60, the object or surface may be in contact with a portion of outer surface 66 of carrier frame 60 between a pair of adjacent rolls 80. If this occurs, rolls 80 will not be able to feed the object or advance roll assembly 50 unless carrier frame 60 is rotated to provide contact between the object or surface and at least one roll 80.

FIGS. 3-10 illustrate an example embodiment of a roll 80 suitable for use with roll assembly 50. In this embodiment, roll 80 includes a hub 90 and a pair of tires 96 mounted thereon. An outer circumferential surface 98 of each tire 96 provides a respective contact surface 84. Hub 90 includes a central portion 92 that includes gear face 82 thereon and a tire mount portion 94 on each axial side of central portion 92 that receives a respective tire 96. Alternatives include those wherein gear face 82 is offset from the center of hub 90 such as at an axial end of hub 90. Further, while two tires 96A, 96B are shown, the specific number of tires 96 is not intended to be limiting as one tire 96 or more than two tires 96 may be used as desired. Additional alternatives include those wherein contact surface 84 is integrally formed on hub 90.

Referring to FIGS. 3-6, hub 90 includes a shaft 110 that defines rotational axis B of roll 80. The ends of shaft 110 form trunnions 112A, 112B that facilitate the mounting of roll 80 in a respective opening 64 as will be discussed in greater detail below. Hub 90 also includes a retaining feature that retains each tire 96 on hub 90. In the example embodiment illustrated, the retaining feature is provided in the form of a catch 100 that extends radially with respect to axis B from hub 90 near an axial end of hub 90. In the example embodiment illustrated, a total of four catches, 100A, 100B, 100C, 100D are provided. Catches 100A and 100B are located diagonally across from one another near a first axial end 90A of hub 90. Catches 100C and 100D are located diagonally across from one another near a second axial end 90B of hub 90. Hub 90 also includes a plurality of radially extending ribs 102 that align tire 96 on hub 90. While the example embodiment illustrated includes four catches 100 and four ribs 102, any suitable number may be used, as desired.

With reference to FIGS. 6-10, central portion 92 of hub 90 includes cavities 104 formed between ribs 102. Each tire 96 includes a channel 106 that is shaped to receive shaft 110 and ribs 102 therethrough. Channel 106 extends axially through at least a portion of the tire 96. Each tire 96 further includes projections 108 that extend from an inner axial surface 97A of tire 96 and correspond with cavities 104 of hub 90. Channel 106 and projections 108 aid in the alignment of each tire 96 with hub 90 and prevent tire 96 from slipping relative to hub 90 when hub 90 rotates to ensure that tire 96 rotates therewith. Each tire 96 also includes a catching surface 114 located inside of outer axial surface 97B. Each tire 96 is preferably made of a flexible material having a relatively high coefficient of friction such as, for example a natural rubber, e.g., isoprene, or a synthetic rubber, e.g., EPDM.

To mount tire 96 on hub 90, shaft 110 of hub 90 is first inserted into channel 106 of tire 96. Channel 106 is aligned with ribs 102 and tire 96 is slid over catch 100 along shaft 110 and ribs 102 toward central portion 92. When inner axial surface 97A of tire 96 reaches central portion 92, projections 108 are inserted into the corresponding cavities 104 of hub 90. Catching surface 114 of tire 96 is then slipped over catch 100 of hub 90 to ensure that tire 96 is retained on hub 90.

This procedure can be reversed for disassembly. Alternatively, each catch 100 may extend from shaft 110 at the axial ends 90A, 90B of shaft 110 such that outer axial surface 97B of tire 96, rather than an internal catching surface 114, engages catch 100. However, this alternative increases the axial length of each roll 80 and therefore also increases the widths of openings 64.

In the embodiment illustrated, roll 80 has a barrel shaped outer circumference. Specifically, a diameter of each tire 96 proximate to central portion 92 of hub 90 is greater than a diameter of the tire proximate to the corresponding trunnion 112A, 112B. The use of a barrel shape increases the circularity of continual contact surface 88 that is formed collectively by latitudinal portions 84A of contact surfaces 84 around the outer periphery of carrier frame 60. This results in smoother rotation against a surface when carrier frame 60 rotates with input shaft 52.

Figure 13:
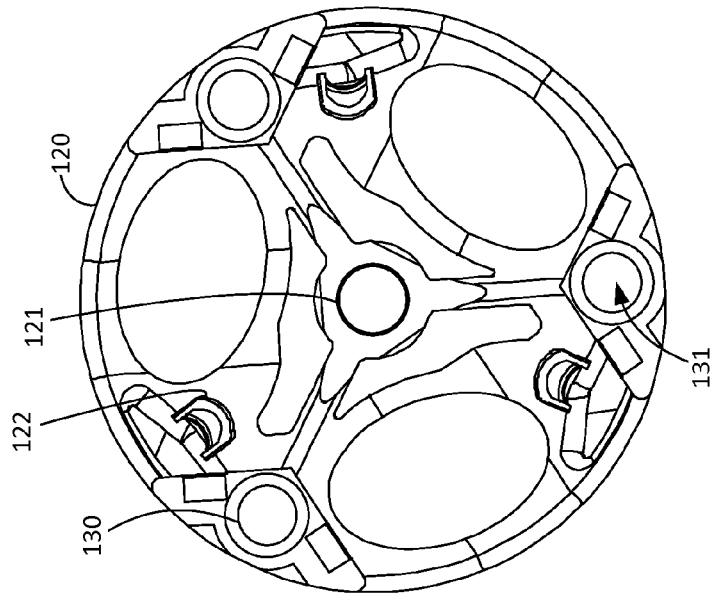
FIG. 13 is an elevation view from a second end of the disc illustrated in FIG. 11.
Figure 15:
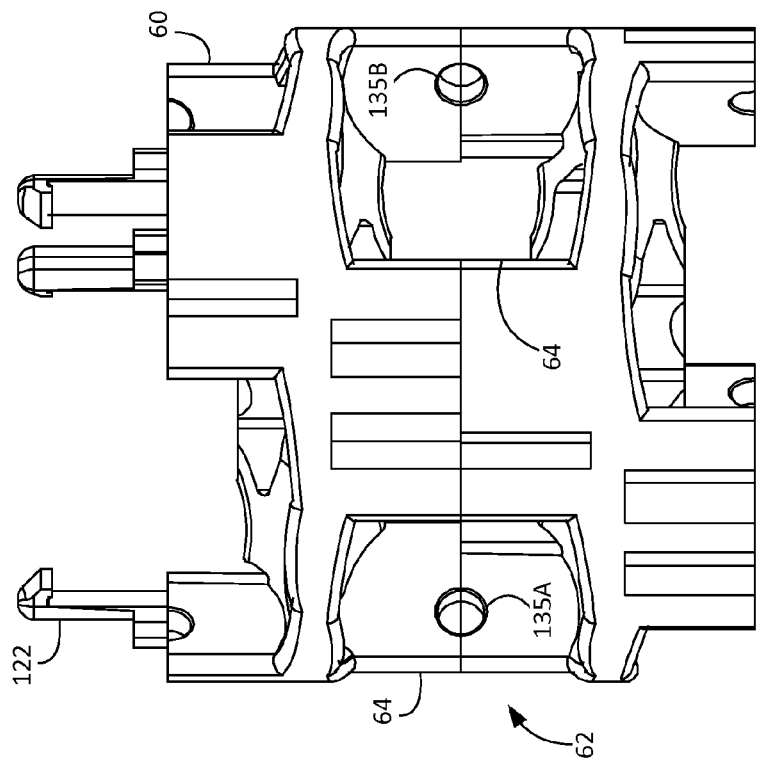
FIG. 15 is a side elevation view of the pair of discs illustrated in FIG. 14 coupled to one another.
Figure 14:
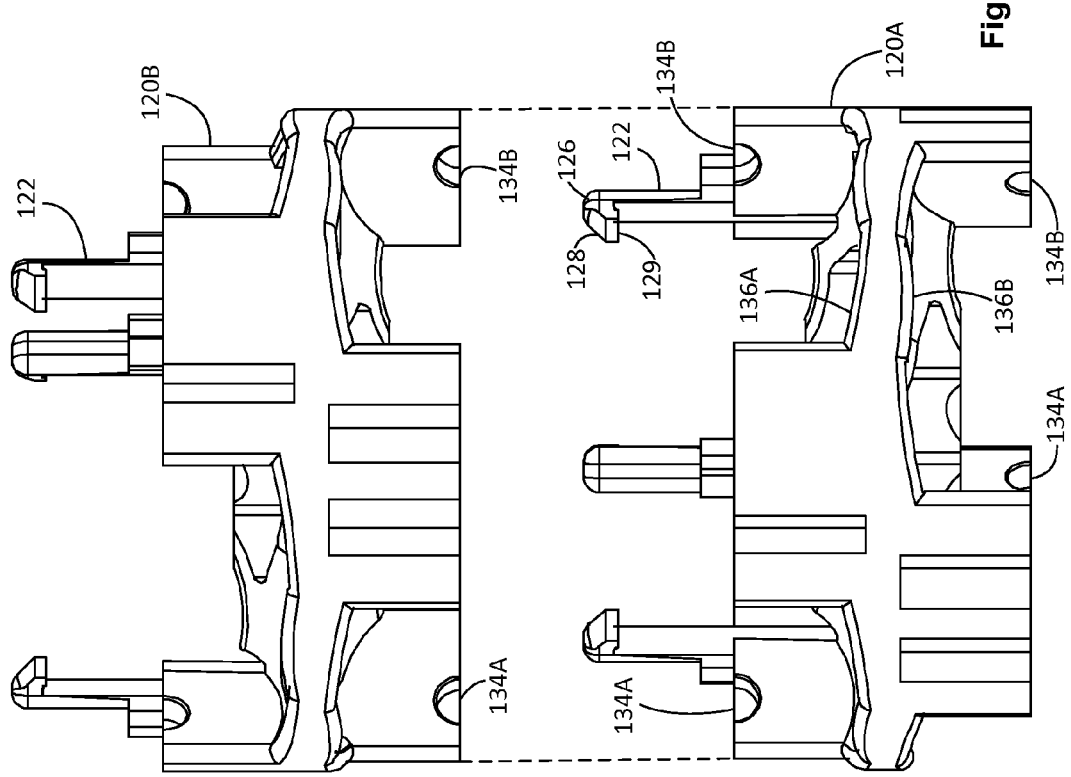
FIG. 14 is a side elevation view showing the alignment of a pair of uncoupled discs according to one example embodiment.

An example embodiment of a carrier frame 60 suitable for use with roll assembly 50 is illustrated in FIGS. 11-19. In this embodiment, carrier frame 60 is comprised of a plurality of discs 120 coupled to each other as shown in FIGS. 14 and 15. Each set 62 of openings 64 is formed between a pair of discs 120. In the embodiment illustrated, discs 120 are coupled to each other by a snap fit engagement. Alternatives include those wherein discs 120 are coupled with an adhesive or with fasteners such as, for example screws or snap fitting brackets that bridge adjacent discs together.

Figure 11:
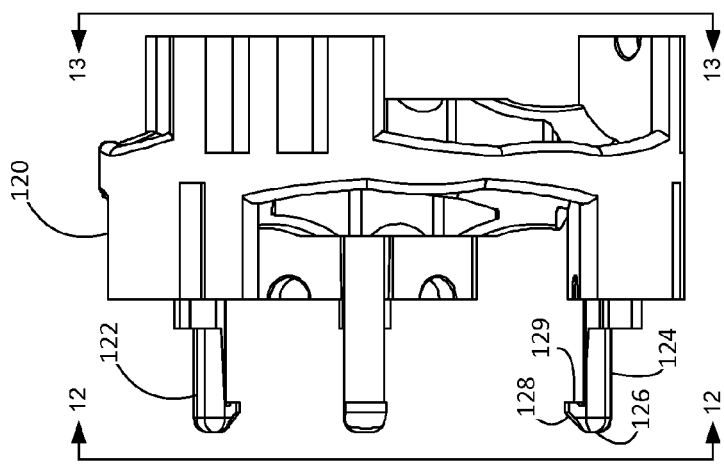
FIG. 11 is a side elevation view of a disc according to one example embodiment.
Figure 12:
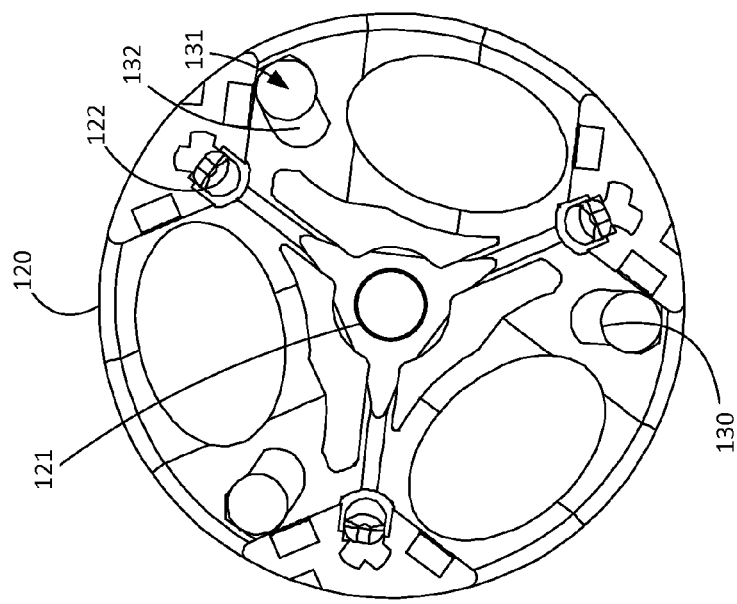
FIG. 12 is an elevation view from a first end of the disc illustrated in FIG. 11.

Referring to FIGS. 11-13, each disc 120 includes a center hole 121 that receives input shaft 52 therethrough to mount carrier frame 60 to input shaft 52. Each disc 120 also includes a plurality of latch members 122 and a plurality of corresponding catches 130 that receive the latch members 122 of an adjacent disc 120 to couple discs 120 to each other. In this embodiment, each latch member 122 is molded as part of disc 120. Each catch 130 is a slot having a through-hole 131 that extends through disc 120 in the axial direction and a recessed portion 132 for engaging and retaining latch member 122. Each latch member 122 includes an arm 124 that extends axially from disc 120 and a head 126 on the end of arm 124. Head 126 has a tapered portion 128 that permits insertion of head 126 into through-hole 131 and a latching surface 129 that abuts recessed portion 132 to secure two discs 120 to each other.

With reference to FIGS. 14-15, in order to couple two discs 120A, 120B, a user simply aligns the latch members 122 of a first disc 120A with the corresponding catches 130 of a second disc 120B. The user then pushes the first disc 120A toward the second disc 120B. As tapered portions 128 of heads 126 enter through-holes 131, latch members 122 deflect to permit heads 126 to pass through through-holes 131. Once heads 126 have passed through through-holes 131, latch members 122 straighten and each latching surface 129 is positioned against a corresponding recessed portion 132 thereby securing discs 120A, 120B to each other. In order to disassemble discs 120A, 120B, the user applies a tool with a pointed tip against tapered portion 128 of each head 126 to deflect each latch member 122 and release latching surface 129 from recessed portion 132.

Each disc 120 includes partial trunnion mounts 134A, 134B such that when adjacent discs 120 are joined together, the partial trunnion mounts 134A, 134B of each disc meet to form trunnion mounts 135A, 135B in each opening 64. Each partial trunnion mount 134A, 134B is a recessed pocket formed in disc 120 in the radial direction. Each trunnion mount 135A, 135B receives a respective one of the trunnions 112A, 112B of a corresponding roll 80 to permit rotation of the roll 80 relative to carrier frame 60.

The process for assembling the example roll assembly 50 is illustrated in FIGS. 16-18. Input shaft 52 is first inserted through the center hole 121 of a first disc 120A. A first gear 54A is then slid onto input shaft 52 with key 56 of gear 54A aligned with keyway 58 of input shaft 52. Rolls 80 are then positioned on first disc 120A such that trunnions 112A, 112B of each roll 80 are positioned in the partial trunnion mounts 134A, 134B of first disc 120A. A second disc 120B is then slid onto input shaft 52. Latch members 122 of second disc 120B are aligned with and coupled to catches 130 of first disc 120A to couple second disc 120A to first disc 120A. This secures rolls 80 within openings 64 to form a first set 62, 86 of openings 64 and rolls 80. This process may then be repeated to form additional sets 62, 86.

Figure 19:
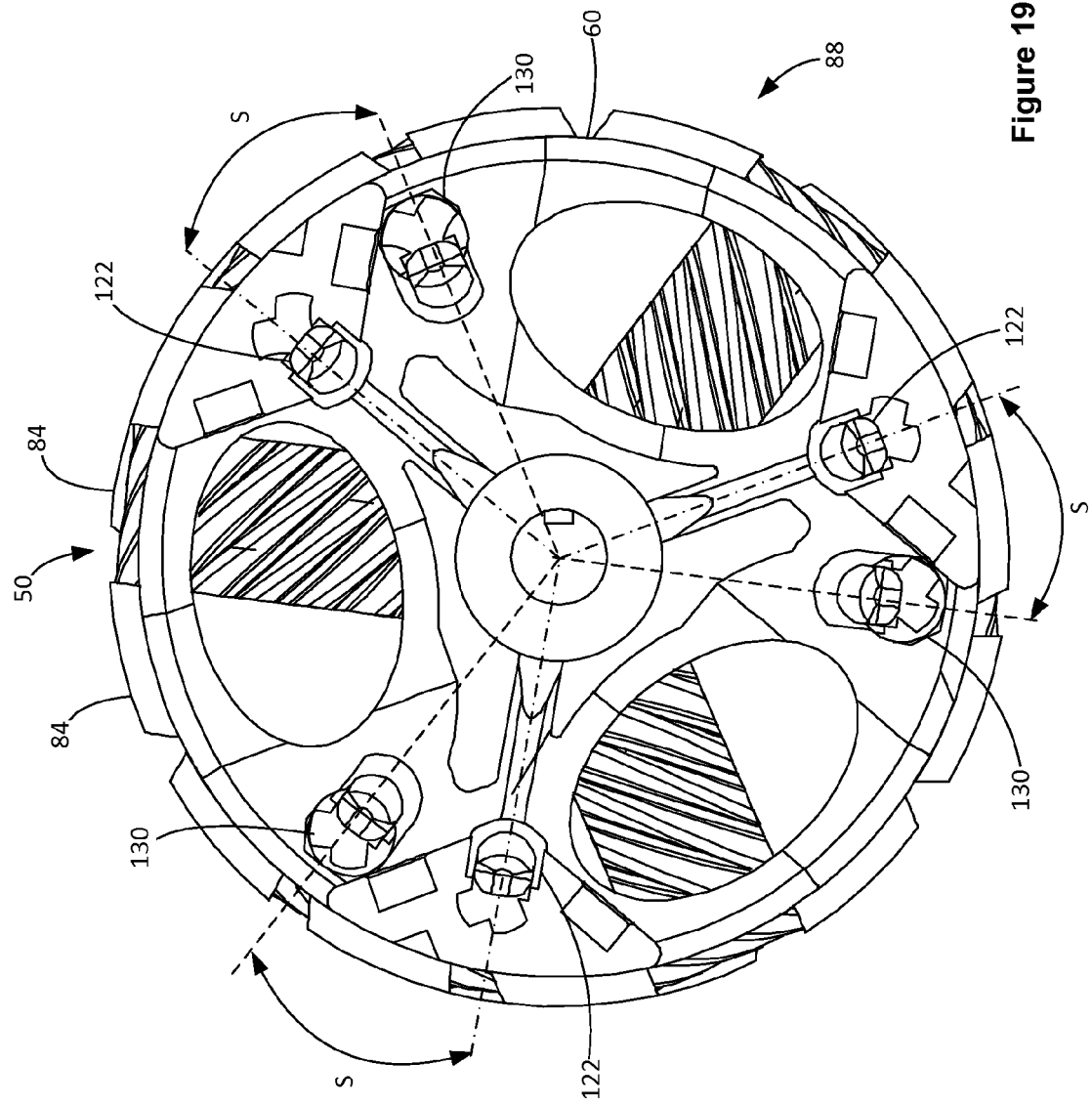
FIG. 19 is an elevation view from an end of a multi-translative roll assembly according to one example embodiment.

In the example embodiment illustrated, the orientation of latch members 122 and catches 130 on each disc cause each set 62, 86 of openings 64 and rolls 80 to be circumferentially offset from an adjacent set 62, 86. As illustrated in FIG. 19, each catch 130 is spaced circumferentially from a corresponding latch member 122 of the same disc 120. In one embodiment, the spacing S between latch member 122 and catches 130 is about 27°. As a result, latch members 122 of adjacent discs 120 are circumferentially offset from each other. Further, with reference to FIGS. 14 and 15, each disc includes first slots 136A on the same axial side of the disc 120 as latch members 122 and second slots 136B on the opposite axial side. When two discs 120 are joined, first slots 136A of one disc mate with second slots 136B of the other disc to form openings 64. First slots 136A are circumferentially spaced from second slots 136B of the same disc 120 to the same degree as the latch members 122 and latches 130 of that disc 120. This allows the slots 136A, 136B of adjacent discs to align properly to form openings 64.

Referring to FIGS. 20-23, an example embodiment of a carrier frame 160 is illustrated. In this embodiment, carrier frame 160 is formed by one or more axially aligned modules 170. Each module 170 includes a through hole 172 that receives input shaft 52. Each module 170 includes a set 162 of openings 164 therein that receives a corresponding set 86 of rolls 80. A corresponding gear 54 is received in a center portion of each module 170. In the example embodiment illustrated, an inner portion of a first opening 164A includes a passageway 174 that permits insertion of gear 54 into the center portion of module 170. In order to aid the assembly of roll assembly 50, the remaining openings 164 of module 170 include a stops 176 to align gear 54 with through hole 172 to receive input shaft 52. Accordingly, in order to assemble gear 54 in module 170, a user inserts gear 54 through first opening 164A and into passageway 174. Stops 176 prevent gear 54 from passing through the center portion of module 170 into another opening as shown in FIG. 22. Input shaft 52 is then inserted into through hole 172 and through gear 54 in order to position gear 54 in the center portion of module 170.

Each opening 164 also includes trunnion mounts 168A, 168B that receive trunnions 112A, 112B of a corresponding roll 80. In the example embodiment illustrated, trunnions 112A, 112B are retained in trunnion mounts 168A, 168B by a snap fit engagement. Specifically, each trunnion mount 168A, 168B includes a pair of resilient pegs 178A, 178B. In order to assemble rolls 80 in module 170, a user aligns trunnions 112A, 112B with trunnion mounts 168A, 168B and presses each trunnion 112 past pegs 178. Pegs 178 then retain trunnions 112A, 112B in trunnion mounts 168A, 168B. When assembled, the gear face 82 of each roll 80 is mated with gear 54 in the center portion of module 170 as shown in FIG. 23.

In the example embodiment illustrated, each module 170 includes a dowel 180 and a dowel mount 182 that receives the dowel 180 of an adjacent module 170. As illustrated in FIG. 20, dowel 180 is spaced circumferentially from dowel mount 182 of the same module 170. In one embodiment, the spacing between dowel 180 and dowel mount 182 is about 60° where carrier frame 160 includes two sets 162, 86 of openings 164 and rolls 80, respectively. It will be appreciated that the spacing decreases as the number of sets 162, 86 increases. As discussed in more detail above, this spacing causes adjacent sets 162, 86 of openings 164 and rolls 80 to be circumferentially offset from each other to form a continual contact surface around the outer periphery of carrier frame 160.

FIGS. 24-26 illustrate another example embodiment of a suitable carrier frame 260. In this embodiment, carrier frame 260 includes a unitary construction. Each set 262 of openings 264 is formed in a body 270 of carrier frame 260. Each opening 264 includes trunnion mounts 268A, 268B that receive trunnions 112A, 112B of a corresponding roll 80 in a snap fit engagement. Each set 262 of openings 264 is circumferentially offset from the adjacent sets 262 so that rolls 80 form continual contact surface 288 as illustrated in FIG. 26.

Input shaft 52 is connected to and receives a drive force from a first drive output (not shown). In the example embodiment illustrated, input shaft 52 includes an input gear 282 mounted thereon that receives the drive force from the first drive output. A spur gear 284 is fixedly mounted to carrier frame 260 to receive a drive force from a second drive output (not shown) to rotate carrier frame 260 about axis A. In the example embodiment illustrated, spur gear 284 is mounted on an axial end of carrier frame 260; however, spur gear 284 may also be formed in a portion of carrier frame 260 inward from its axial ends. The second drive output may be from a different drive source than the first drive output. Alternatively, the first and second drive outputs may be from the same drive source. The first and second drive outputs can be selectively operated to advance the object being moved generally perpendicular to axis A, generally parallel to axis A or a combination thereof. For example, in order to advance the object being moved in a direction generally parallel to axis A, the first drive output is activated to rotate rolls 80 along axes B (FIG. 2A). In order to advance the object in a direction generally perpendicular to axis A, both the first and second drive outputs must be activated in order to rotate input shaft 52 at the same angular velocity as carrier frame 260 in order to prevent rotation of rolls 80 relative to axes B. Further, the speeds of the first and second drive outputs may be altered as desired to rotate carrier frame 260 and input shaft 52 at different angular velocities thereby rotating both carrier frame 260 and rolls 80 in order to move the object in a direction that is acute or obtuse to axis A.

Figure 27:
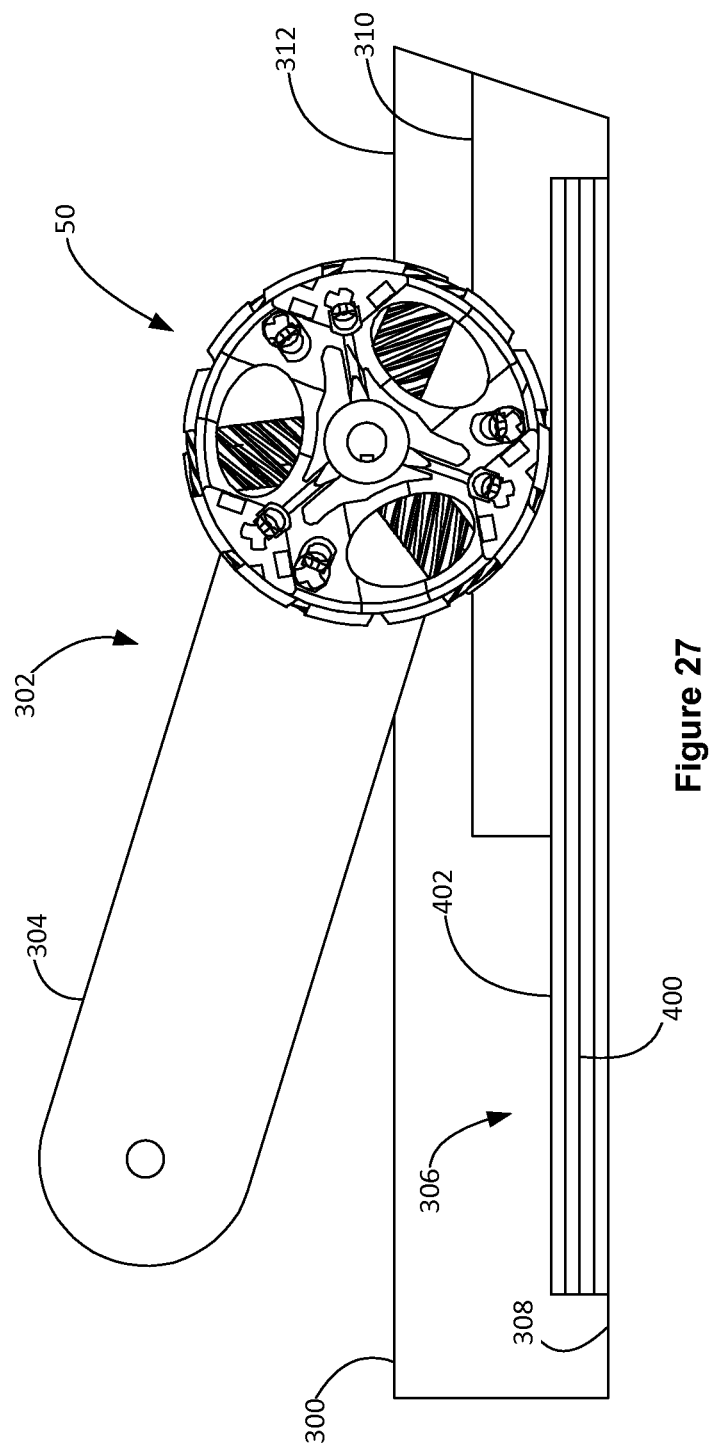
FIG. 27 is a schematic view of a multi-translative roll assembly in the form of a pick mechanism in an imaging device according to one example embodiment.

Roll assembly 50 can be used in a variety of applications where the ability to move an object in multiple translative directions, such as either of two generally perpendicular directions or a combination thereof, is desired. For example, FIG. 27 shows an example embodiment of roll assembly 50 used as a pick wheel for a pick mechanism 302 in an imaging device 300. It will be appreciated that the use of roll assembly as a pick wheel for a pick mechanism is merely an example application of roll assembly 50 and that additional uses are contemplated. For instance, roll assembly 50 may also be employed as a feed roller downstream from the pick mechanism of an imaging device. Further, roll assembly may be employed in applications outside the imaging industry where it is advantageous to be able to move objects in either of two generally perpendicular directions such as, for example, in a conveyor system on a manufacturing assembly line or sorting line or on the wheels of a motorized vehicle such as, for example a fork lift as discussed in greater detail below.

In the example embodiment illustrated, pick mechanism 302 includes a pick arm 304 and at least one roll assembly 50 mounted on an end thereof. Pick mechanism 302 is positioned in a media storage area 306, such as a media input tray or a media feeder, having a stack of media 400 on a bottom surface 308 of media storage area 306. Pick arm 304 may be movable to lower roll assembly 50 into contact with a topmost sheet 402 of media stack 400. Alternatively, bottom surface 308 may be raisable to lift media stack 400 into contact with roll assembly 50. Pick mechanism 302 is operatively coupled to a motor (not shown) that provides rotational force to input shaft 52 of roll assembly 50. Media storage area 306 includes a reference surface 310 positioned on a side wall 312 thereof.

Referring to FIGS. 28-30, in one embodiment, roll assembly 50 allows pick mechanism 302 to first align media sheet 402 in a direction substantially perpendicular to media process direction P and then advance sheet 402 from media storage area 306 in media process direction P. In FIG. 28, media sheet 402 is shown in media storage location 306 in an offset alignment with respect to reference surface 310. As shown in FIG. 29, rolls 80 are rotated relative to carrier frame 60 in a direction transverse to media process direction P to move a lateral edge 404 of media sheet 402 against reference surface 310. Once media sheet 402 is aligned with reference surface 310, carrier frame 60 is rotated with input shaft 52 to advance media sheet 402 in media process direction P as shown in FIG. 30.

In some embodiments, roll assembly 50 is self-balancing and able to automatically switch between rotating carrier frame 60 with input shaft 52 about axis A and rotating rolls 80 relative to carrier frame 60 about axes B. When a drive force is supplied to input shaft 52, whether carrier rotates about axis A or rolls 80 rotate about axes B depends on which of the components is freest to turn. Specifically, the difference between a first resistance $R_1$ encountered by the object being moved by roll assembly 50 in a direction parallel to rotational axis A of input shaft 52 and a second resistance $R_2$ in a direction transverse to rotational axis A determines whether carrier frame 60 rotates with input shaft 52 in a direction of rotation of input shaft 52 and whether rolls 80 rotate relative to carrier frame 60 in a direction transverse to the direction of rotation of input shaft 52.

Where roll assembly 50 is utilized in an imaging device and it is desired to align the media with a reference edge in a direction orthogonal to media process direction P prior to advancing the media in media process direction P, the balance of reduction ratios, the gear mesh efficiency between gear 54 and gear face 82 and frictional forces of roll assembly 50 are such that roll assembly 50 prefers feeding toward the reference edge first. Therefore, if input shaft 52 is aligned generally perpendicular to the reference edge, upon receiving a drive force, input shaft 52 will first rotate rolls 80 about axes B relative to carrier frame 60. Once the lateral edge of the media sheet contacts the reference edge, the resistance encountered by the media sheet in the direction orthogonal to media process direction P will increase. This increased resistance in the direction orthogonal to media process direction P then makes it easier for carrier frame 60 to rotate along rotational axis A than for rolls 80 to rotate about axes B. As a result, the relative forces impacting roll assembly 50 cause carrier frame 60 to rotate with input shaft 52 about axis A in order to advance the media sheet in media process direction P. It will be appreciated that this relationship can be reversed as desired to favor rotation of carrier frame 60 about axis A over rotation of rolls 80 about axes B.

In those embodiments where roll assembly 50 is self balancing, such factors as the ratio of the number of teeth on gear 54 to the number of teeth on gear faces 82 of rolls 80, the angle of helix on gear 54 and gear faces 82, and the ratio of the diameter of contact surfaces 84 of rolls 80 with respect to rotational axes B to the diameter of continual contact surface 88 with respect to rotational axis A may be tuned to adjust the amount of bias that roll assembly 50 has toward feeding in media process direction P or a direction transverse thereto. For instance, a roll assembly 50 according to one example embodiment has been constructed that favors rotation of rolls 80 about rotational axes B over rotation of carrier frame 60 about rotational axis A. This embodiment includes nine teeth on gear 54 and sixteen teeth on each gear face 82. The angle of helix of gear 54 is about 45° and the angle of helix of each gear face 82 is about 45°. Further, the diameter of contact surfaces 84 of rolls 80 with respect to rotational axes B ranges from about 8.95 mm at an outermost axial portion of contact surface 84 to about 12.61 mm at an innermost axial portion of contract surface 84 and the diameter of continual contact surface 88 with respect to rotational axis A is about 31 mm. In order to reverse this bias, one could increase the ratio of the number of teeth on gear 54 to the number of teeth on gear faces 82 of rolls 80 and/or decrease the ratio of the diameter of contact surfaces 84 of rolls 80 with respect to rotational axes B to the diameter of continual contact surface 88 with respect to rotational axis A. To amplify this bias, one could decrease the ratio of the number of teeth on gear 54 to the number of teeth on gear faces 82 of rolls 80, increase the angle of helix on gear 54 and gear faces 82 so that gear 54 becomes a worm gear, and/or increase the ratio of the diameter of contact surfaces 84 of rolls 80 with respect to rotational axes B to the diameter of continual contact surface 88 with respect to rotational axis A.

Alternative embodiments include one or more one-way clutching surfaces that permit selection of the feed direction for roll assembly 50 as desired. The one-way clutching surface may include any suitable conventional clutch such as, for example a ratchet clutch, a ball bearing clutch or a needle roller bearing clutch. In a first example embodiment, a one-way clutching surface is positioned between carrier frame 60 and a housing supporting shaft 52. In this embodiment, when input shaft 52 rotates in a first direction, the one-way clutching surface is engaged to prevent carrier frame 60 from rotating with input shaft 52. When input shaft 52 rotates in a second direction opposite the first direction, the second one-way clutching surface is disengaged to permit carrier frame 60 to rotate with input shaft 52. As a result, when input shaft 52 rotates in the first direction, rolls 80 are driven by input shaft 52 about axes B. When input shaft 52 rotates in the second direction, roll assembly 50 is self balancing as discussed above.

In a second example embodiment, a one-way clutching surface is positioned between carrier frame 60 and input shaft 52. In this embodiment, when input shaft 52 rotates in the first direction, the one-way clutching surface is disengaged to permit input shaft 52 to rotate independent of carrier frame 60. As a result, when input shaft 52 rotates in the first direction, roll assembly 50 is self-balancing. When input shaft 52 rotates in the second direction, the one-way clutching surface is engaged and carrier frame 60 is driven by input shaft 52 about axis A.

In a third example embodiment, a one-way clutching surface is positioned between at least a portion of each roll 80 and carrier frame 60. In this embodiment, when input shaft 52 rotates in the first direction, each one-way clutching surface is disengaged to permit rolls 80 to rotate relative to carrier frame 60. When input shaft 52 rotates in the second direction, each one-way clutching surface is engaged to prevent rolls 80 from rotating relative to carrier frame 60. As a result, when input shaft 52 rotates in the first direction, roll assembly 50 is self-balancing. When input shaft 52 rotates in the second direction, carrier frame 60 is driven by input shaft 52 about axis A.

Figure 31:
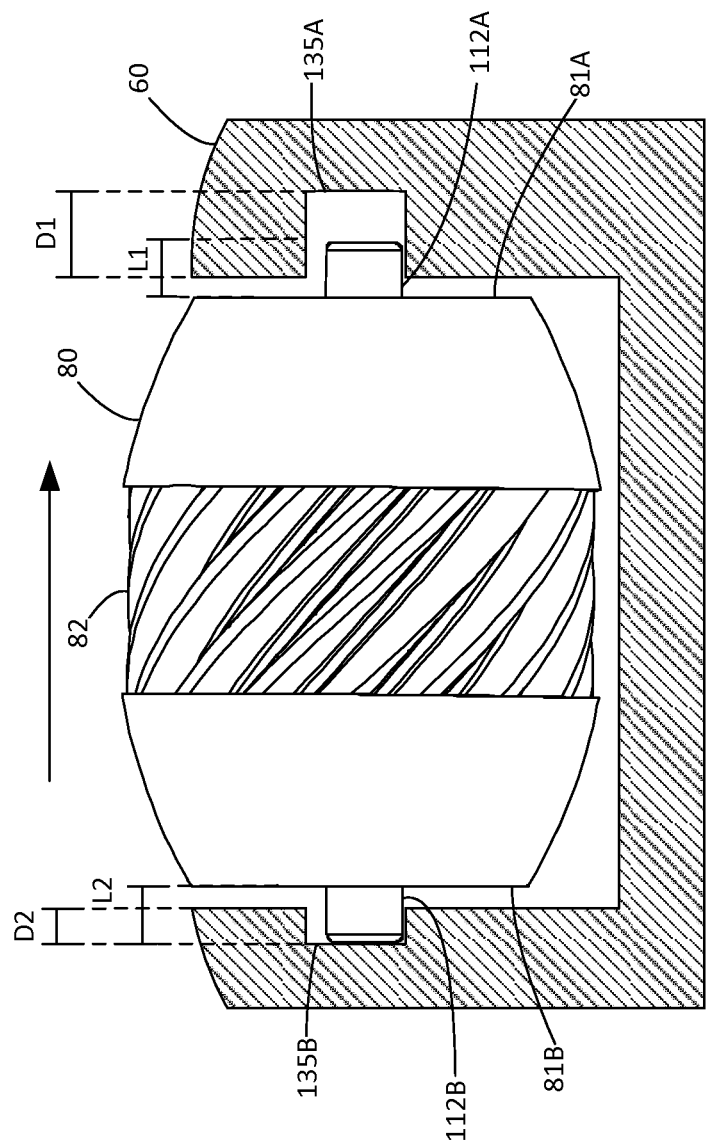
FIG. 31 is a schematic view illustrating a one-way clutching surface between an edge portion of a roll and a portion of a carrier frame surrounding a trunnion mount therein according to one example embodiment.

With reference to FIG. 31, in one example embodiment, the one-way clutching surface positioned between at least a portion of each roll 80 and carrier frame 60 is formed between an edge portion 81 of roll 80 and a portion of carrier frame 60 surrounding one of trunnion mounts 135A, 135B. A depth D1 of trunnion mount 135A is greater than a length L1 that trunnion 112A extends past edge portion 81A of roll 80. However, a depth D2 of trunnion mount 135B is less than a length L2 that trunnion 112B extends past edge portion 81B of roll 80. As a result, when input shaft 52 rotates in the first direction, edge portion 81A of roll 80 is disengaged from the portion of carrier frame 60 surrounding trunnion mount 135A to permit roll 80 to rotate relative to carrier frame 60 about axis B. Edge portion 81B does not contact carrier frame 60 due to the relative lengths of trunnion 112B and trunnion mount 135B. However, when input shaft 52 rotates in the second direction, the reaction force on roll 80 causes edge portion 81A of roll 80 to press against the portion of carrier frame 60 surrounding trunnion mount 135A due to the relative lengths of trunnion 112A and trunnion mount 135A. This, in turn, restricts the rotation of roll 80 relative to carrier frame 60 when input shaft 52 rotates in the second direction.

It will be appreciated that the various example clutching surfaces described above may be combined as desired to provide a roll assembly with more than one clutching surface. For example, in one embodiment, a first one-way clutching surface is provided between at least a portion of each roll 80 and carrier frame 60 and a second one-way clutching surface is provided between carrier frame 60 and the housing. When input shaft 52 rotates in one direction, the first one-way clutching surface is disengaged and the second-one way clutching surface is engaged; as a result, rolls 80 are driven by input shaft 52 about axes B. When input shaft 52 rotates in the opposite direction, the first one-way clutching surface is engaged and the second one-way clutching surface is disengaged; as a result, carrier frame 60 is driven by input shaft 52 about axis A.

In another embodiment, a first one-way clutching surface is provided between carrier frame 60 and input shaft 52 and a second one-way clutching surface is provided between carrier frame 60 and the housing. When input shaft 52 rotates in one direction, the first one-way clutching surface is disengaged and the second-one way clutching surface is engaged; as a result, rolls 80 are driven by input shaft 52 about axes B. When input shaft 52 rotates in the opposite direction, the first one-way clutching surface is engaged and the second one-way clutching surface is disengaged; as a result, carrier frame 60 is driven by input shaft 52 about axis A.

Figure 32:
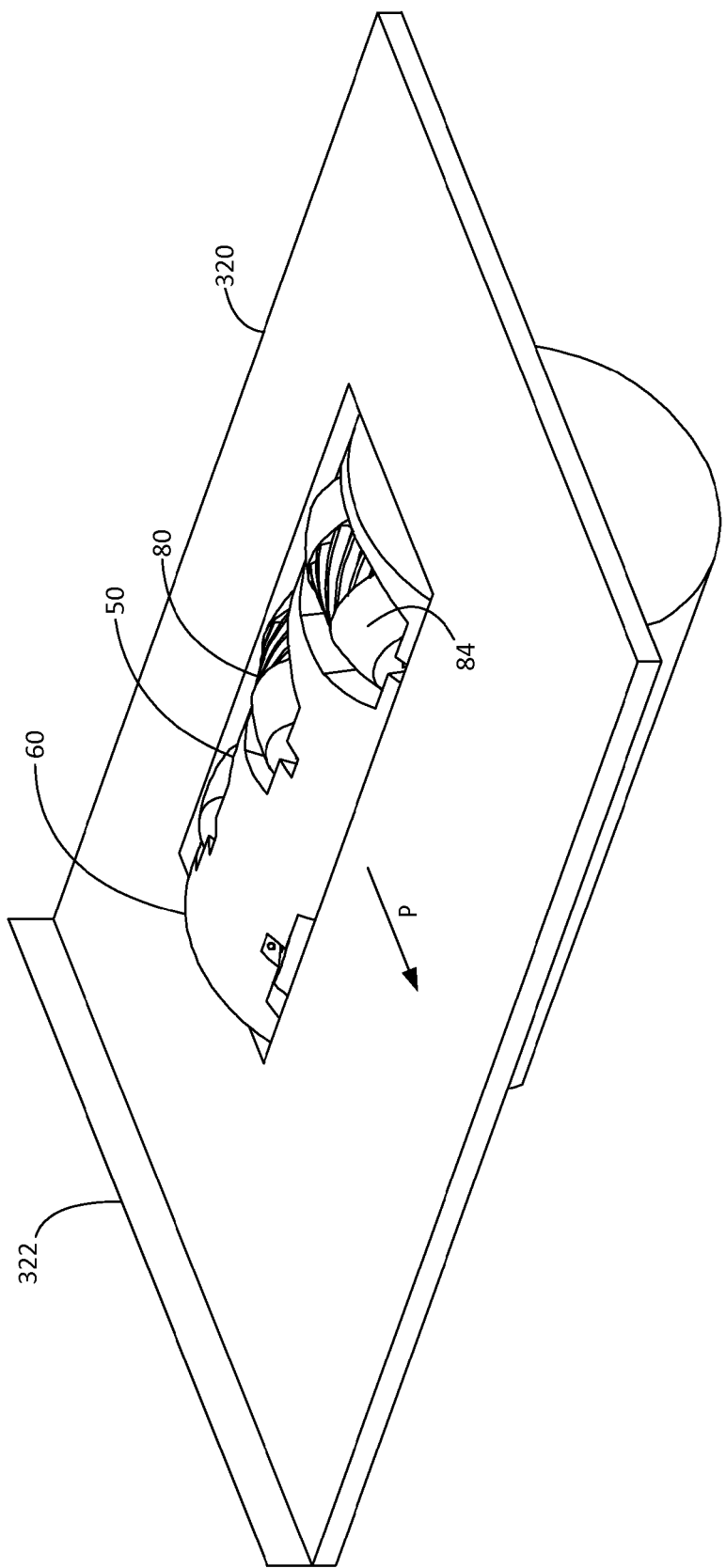
FIGS. 32 and 33 are schematic views of a multi-translative roll assembly protruding through a bottom surface of a media path according to one example embodiment.
Figure 33:
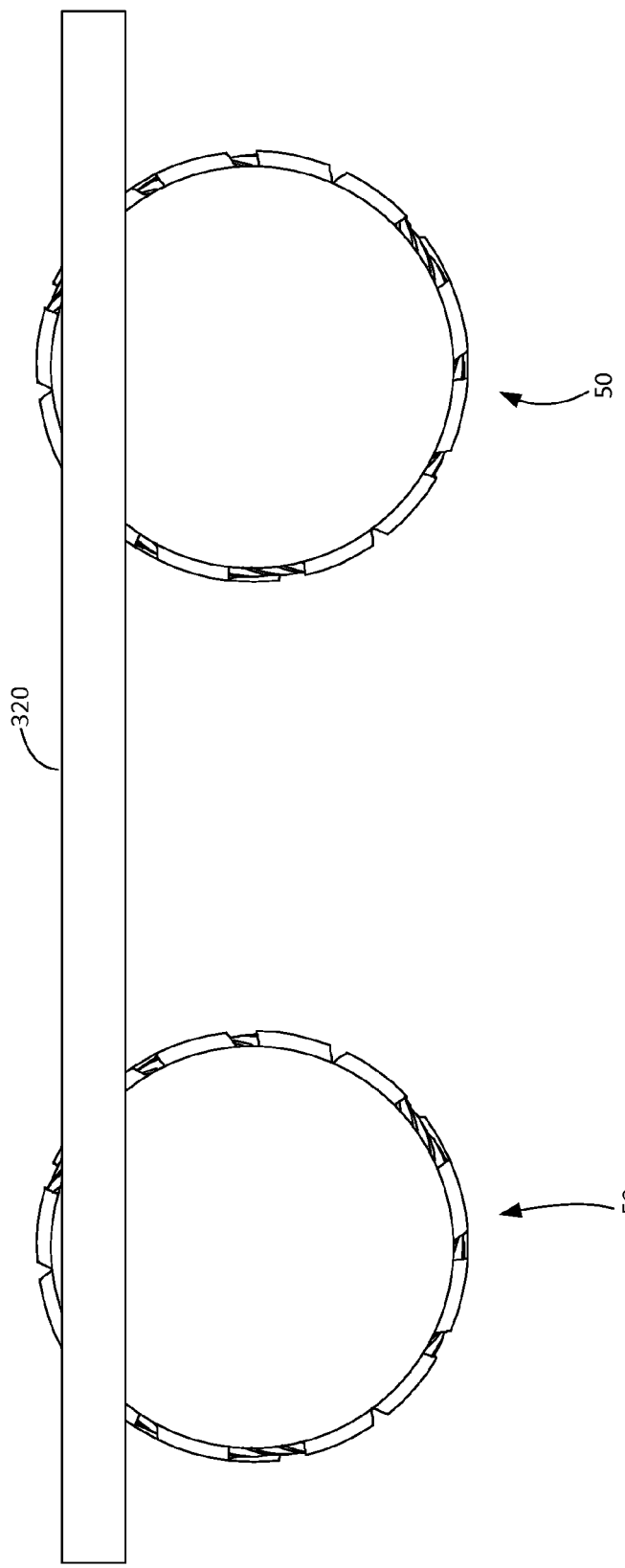

FIGS. 32 and 33 illustrate an alternative embodiment where roll assembly 50 projects from a bottom surface 320 along a media path. In this embodiment, roll assembly 50 is passively driven by media passing roll assembly 50. Media is advanced along the media path in media process direction P by one or more rolls or belts. The upstream rolls or belts advance the leading edge of the media into contact with roll assembly 50. The media contacts the relatively high friction contact surface 84 of rolls 80 which causes carrier frame 60 to rotate about axis A while the input shaft of roll assembly 50 is held in place. As carrier frame 60 rotates with the input shaft held in place, a relative rotation between the two causes rolls 80 to rotate about axes B. The rotation of rolls 80 pushes the media in the direction of longitudinal portion 84B (FIG. 1).

As a result, roll assembly 50 imparts a component of motion to the media in a direction substantially perpendicular to its media process direction P, which can in turn be used to laterally move the media against a reference surface 322. Alternatives include those wherein roll assembly 50 is driven by a drive source (not shown) as discussed above.

Figure 34:
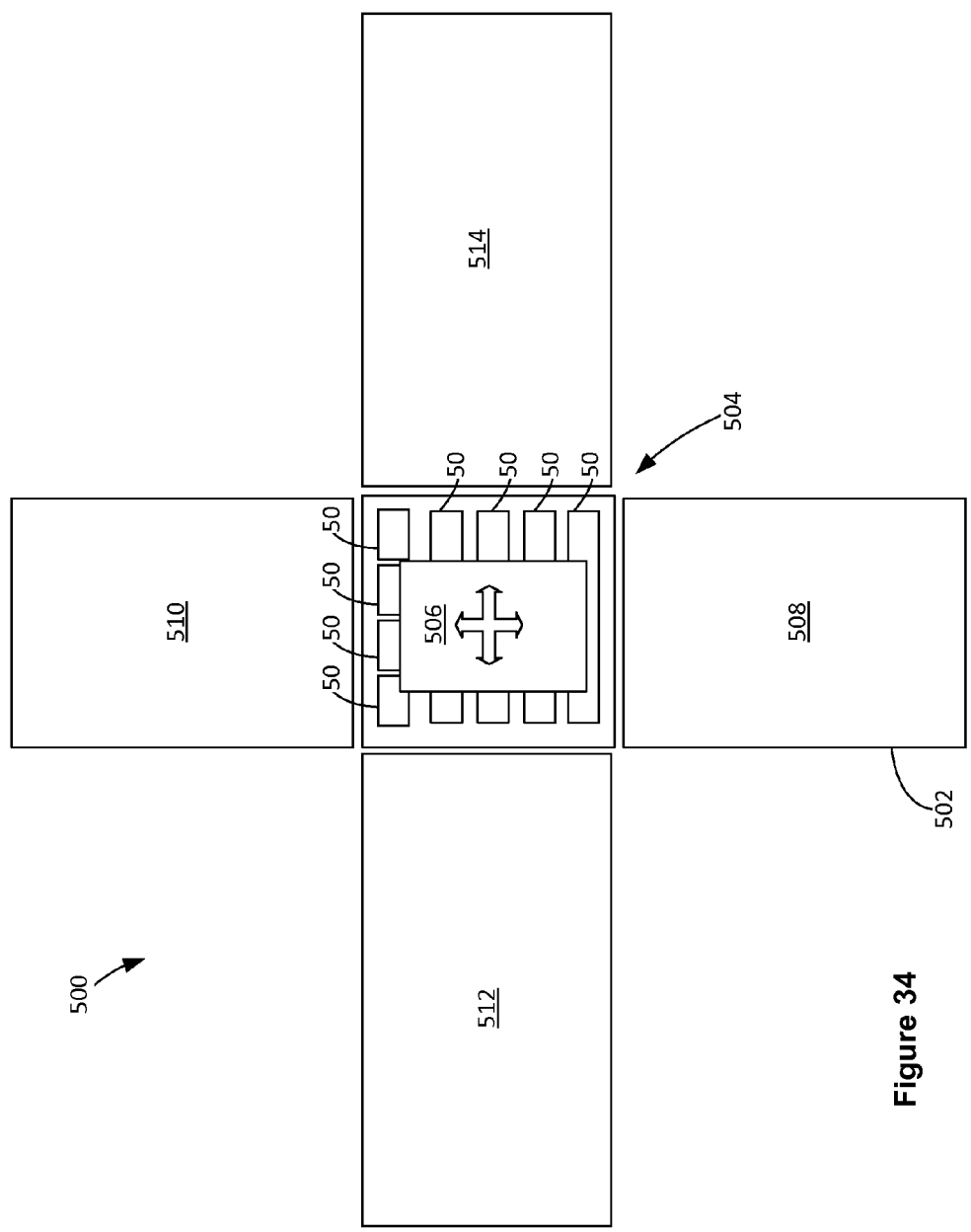
FIG. 34 is a schematic view of a plurality of multi-translative roll assemblies in use in a conveyor system of a sorting line according to one example embodiment.

FIG. 34 illustrates an example embodiment of roll assemblies 50 used in a conveyor system 500 along a manufacturing or sorting line 502. One or more roll assemblies 50 are located at an intersection 504 of line 502. An item traveling along line 502, such as a package 506, approaches intersection 504 from an inlet 508. Once the item reaches intersection 504, roll assemblies 50 can be used to selectively advance or reverse the item in a desired direction. For example, in the example embodiment illustrated the carrier frames of the roll assemblies 50 can be rotated forward to advance the item along a first output path 510 or backward to reverse the item along inlet 508. Further, the rolls of the roll assemblies can be rotated relative to their carrier frame to advance the object along either of a second output path 512 or a third output path 514. It will be appreciated that any number of output paths may be provided as desired. Although output paths 510, 512, 514 illustrated are generally provided at right angles with respect to the roll assemblies 50, the output paths may also be provided at an acute or obtuse angle with respect to the roll assemblies 50. The roll assemblies 50 are able to advance the item traveling along line 502 at acute and obtuse angles by rotating its carrier frame and its rolls simultaneously.

Figure 35:
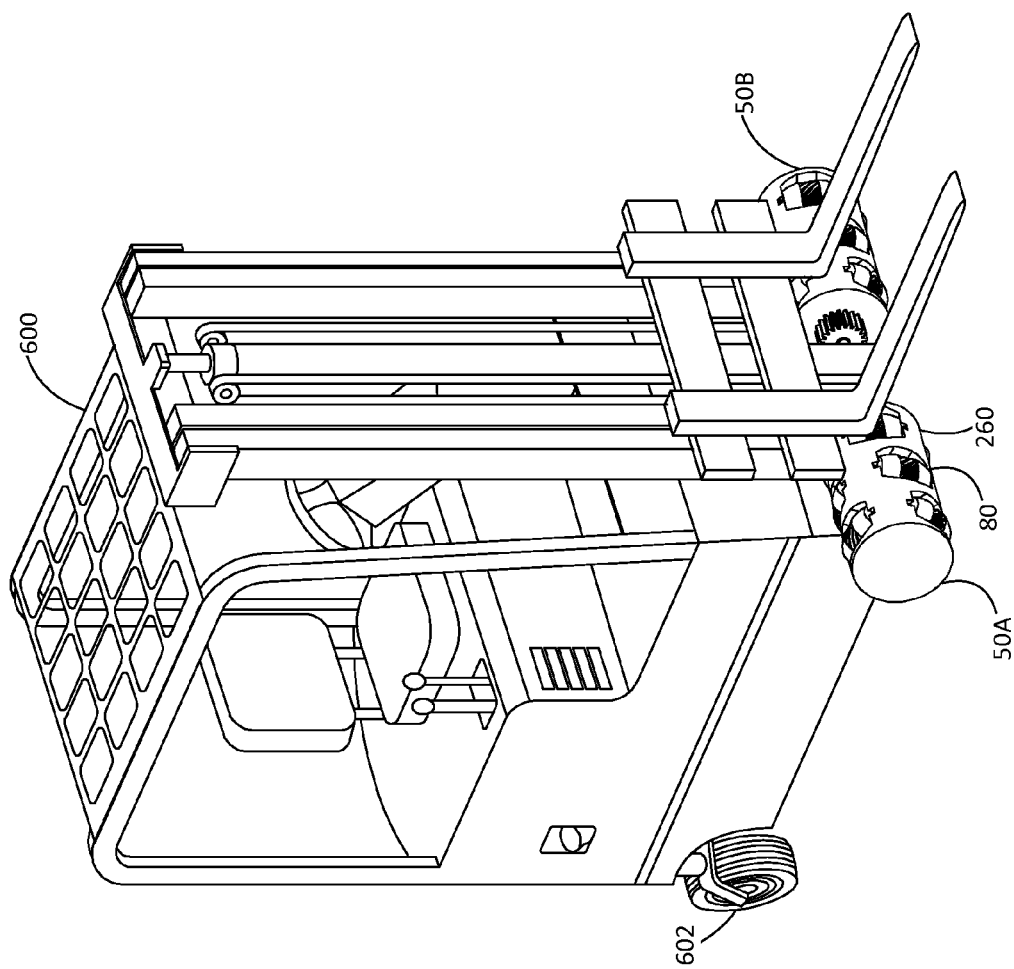
FIG. 35 is a perspective view of a forklift employing a pair of multi-translative roll assemblies for its front wheels according to one example embodiment.

FIG. 35 illustrates an example embodiment of roll assembly 50 used as the wheels of a motorized vehicle. In the example embodiment illustrated, roll assembly 50 is shown on a forklift 600; however, this embodiment is merely an example as any suitable vehicle may be used as desired. In this embodiment, a pair of roll assemblies 50A, 50B is provided as the front wheel of forklift 600. In this embodiment, roll assembly 50 includes carrier frame 260 discussed above in conjunction with FIGS. 24-26. The front axle of forklift 600 supports the weight of the vehicle and serves as an input shaft to provide rotational input to rolls 80. Carrier frame 260 and gear(s) 54 are made of metal such as steel or brass in order to provide the strength necessary to support the vehicle. Floating casters 602 are provided as rear wheels in order to allow forward, reverse, or side to side movement of forklift 600. Alternatively, the rear wheels may also include roll assemblies 50.

Forklift 600 may be driven forward by rotating carrier frames 260 of roll assemblies 50A, 50B about their axles. Forklift 600 may be driven side to side by rotating rolls 80 relative to the carrier frames 260. It will be appreciated that conventional vehicles do not possess this additional maneuverability which may be particularly beneficial when operating in tight spaces. Forklift 600 can also drive diagonally, which also cannot be achieved by conventional vehicles, by rotating carrier frames 260 and rolls 80 simultaneously. Forklift 600 can also pivot in place (like a military tank) by rotating carrier frame 260 of roll assembly 50A forward and carrier frame 260 of roll assembly 50B backward or vice versa. Alternatively, if roll assemblies 50 are also provided on the rear wheels, forklift 600 can pivot in place by rotating rolls 80 of the front roll assemblies 50 in one direction and rotating rolls 80 of the rear roll assemblies 50 in the opposite direction.

The foregoing description of several embodiments has been presented for purposes of illustration. It is not intended to be exhaustive or to limit the application to the precise forms disclosed, and obviously many modifications and variations are possible in light of the above teaching. It is understood that the invention may be practiced in ways other than as specifically set forth herein without departing from the scope of the invention. It is intended that the scope of the application be defined by the claims appended hereto.

What is claimed is:

1. A roll assembly, comprising:
    a rotatable input shaft having a rotational axis;
    at least one gear mounted on the input shaft that rotates with the input shaft;
    a carrier frame mounted on the input shaft and rotatable independent of the input shaft about the rotational axis of the input shaft; and
    a plurality of rolls rotatably mounted about a periphery of the carrier frame, an axial direction of rotation of each roll being transverse to the rotational axis of the input shaft, each roll having a contact surface and a gear face that is operatively coupled to the at least one gear, wherein a diameter of at least a portion of the contact surface of each roll is greater than or equal to a diameter of the gear face of the roll.

2. The roll assembly of claim 1, further comprising a hub on each roll, wherein the contact surface of each roll includes at least one tire mounted on the hub, the hub having a retaining feature to retain the tire on the hub.

3. The roll assembly of claim 1, wherein the carrier frame has a generally cylindrical outer surface.

4. The roll assembly of claim 1, further comprising a set of circumferentially spaced openings in the carrier frame, wherein one of said rolls is rotatably mounted in each of the openings and a portion of each roll protrudes outside its respective opening past the outer periphery of the carrier frame to permit contact with an object being moved by the roll assembly or a surface against which the roll assembly is moving.

5. The roll assembly of claim 4, further comprising:
    a trunnion extending from each axial end of each roll;
    a pair of trunnion mounts formed in each opening,
    wherein each trunnion mount receives a respective one of the trunnions of a corresponding roll to permit rotation of the roll relative to the carrier frame.

6. The roll assembly of claim 4, wherein the plurality of rolls includes a plurality of sets of rolls and the carrier frame includes a plurality of sets of circumferentially spaced openings each corresponding to a respective set of rolls, the sets of openings being axially spaced along the input shaft from each other.

7. The roll assembly of claim 6, wherein the carrier frame is formed by a plurality of discs coupled to each other and mounted on the input shaft.

8. The roll assembly of claim 7, wherein each set of openings is formed between a pair of said discs.

9. The roll assembly of claim 7, wherein the discs are coupled to each other by a snap fit engagement.

10. The roll assembly of claim 6, wherein each set of openings is circumferentially offset from an adjacent set so that latitudinal portions of the contact surfaces of the rolls collectively form a continual contact surface around the outer periphery of the carrier frame.

11. The roll assembly of claim 1, wherein at least a portion of the plurality of rolls have a barrel shaped outer circumference and are circumferentially spaced from each other with respect to the input shaft so that latitudinal portions of the contact surfaces of the rolls collectively form a continual contact surface around the outer periphery of the carrier frame.

12. The roll assembly of claim 1, wherein the roll assembly is self-balancing such that as the input shaft rotates, the difference between a first resistance encountered in a direction parallel to the rotational axis of the input shaft and a second resistance in a direction transverse to the rotational axis of the input shaft determines whether the carrier frame rotates with the input shaft in a direction of rotation of the input shaft and whether the rolls rotate relative to the carrier frame in a direction transverse to the direction of rotation of the input shaft.

13. The roll assembly of claim 1, wherein the at least one gear is slidably mounted on the input shaft and includes one of a key and a keyway and the input shaft includes a corresponding one of a keyway and a key for receiving the one of the key and the keyway of the at least one gear so that the at least one gear rotates with the input shaft.

14. The roll assembly of claim 1, further comprising a gear mounted to the carrier frame for receiving a drive force to rotate the carrier frame about the rotational axis of the input shaft, wherein rotation of the input shaft causes the rolls to rotate relative to the carrier frame.

15. A device having a roll assembly for advancing an object in contact with the roll assembly or providing translative movement to the device relative to a surface in contact with the roll assembly, the roll assembly comprising:
   a rotatable input shaft having a rotational axis;
   a plurality of gears mounted on the input shaft that rotate with the input shaft;
   a plurality of sets of rotatable rolls, each set of rolls being operatively coupled to a corresponding gear of the plurality of gears, an axial direction of rotation of each roll being transverse to the rotational axis of the input shaft, each roll having:
      a gear face that engages with the corresponding gear;
      a friction surface portion for contacting the object or the surface, a diameter of at least a portion of the friction surface portion of the roll being greater than or equal to a diameter of the gear face of the roll; and
      a trunnion extending from each axial end of the roll; and
   a carrier frame mounted on the input shaft and rotatable independent of the input shaft about the rotational axis of the input shaft, the carrier frame having a generally cylindrical outer surface and further including:
      a plurality of sets of circumferentially spaced openings each corresponding to a respective set of rolls, the sets of openings being axially spaced from each other along the input shaft, one of said rolls being rotatably mounted in each of the openings and a portion of each roll protruding outside its respective opening past the outer circumference of the carrier frame to permit contact with the object or the surface; and
      a pair of trunnion mounts formed in each opening, each trunnion mount receiving a respective one of the trunnions of a corresponding roll to permit rotation of the roll relative to the carrier frame.

16. The device of claim 15, wherein the carrier frame is formed by a plurality of discs coupled to each other and mounted on the input shaft and each set of openings is formed between a pair of said discs.

17. The device of claim 16, wherein each of the discs includes a plurality of latch members and a plurality of catches for receiving the latch members of an adjacent disc to couple the discs to each other to form the carrier frame, the catches of each disc being spaced circumferentially from a corresponding latch member of the same disc in order to circumferentially offset each set of openings from the adjacent set of openings.

18. The device of claim 15, further comprising a hub on each roll having a central portion that includes the gear face thereon and a tire mount portion positioned on each axial side of the central portion, wherein the friction surface portion includes a tire mounted on each tire mount portion and a diameter of each tire proximate to the central portion of the hub is greater than a diameter of the tire proximate to the corresponding trunnion.

19. The device of claim 15, wherein the roll assembly is self-balancing such that as the input shaft rotates, the difference between a first resistance in a direction parallel to the rotational axis of the input shaft and a second resistance in a direction transverse to the rotational axis of the input shaft determines whether the carrier frame rotates with the input shaft in a direction of rotation of the input shaft and whether the rolls rotate relative to the carrier frame in a direction transverse to the direction of rotation of the input shaft.

20. The device of claim 15, further comprising a gear mounted to the carrier frame for receiving a drive force to rotate the carrier frame about the rotational axis of the input shaft, wherein rotation of the input shaft causes the rolls to rotate relative to the carrier frame.

* * * * *